United States Patent
Kaneda et al.

(10) Patent No.: US 11,296,316 B2
(45) Date of Patent: Apr. 5, 2022

(54) NICKEL-MANGANESE COMPOSITE HYDROXIDE, METHOD FOR PRODUCING THE SAME, POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

(71) Applicant: SUMITOMO METAL MINING CO., LTD., Tokyo (JP)

(72) Inventors: Haruki Kaneda, Niihama (JP); Yuki Koshika, Niihama (JP); Takaaki Ando, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 335 days.

(21) Appl. No.: 16/320,601

(22) PCT Filed: Jul. 28, 2017

(86) PCT No.: PCT/JP2017/027538
§ 371 (c)(1),
(2) Date: Apr. 18, 2019

(87) PCT Pub. No.: WO2018/021555
PCT Pub. Date: Feb. 1, 2018

(65) Prior Publication Data
US 2019/0248673 A1  Aug. 15, 2019

(30) Foreign Application Priority Data

Jul. 29, 2016 (JP) .............................. JP2016-150505

(51) Int. Cl.
*H01M 4/505* (2010.01)
*H01M 4/525* (2010.01)
(Continued)

(52) U.S. Cl.
CPC ............ *H01M 4/505* (2013.01); *C01G 53/00* (2013.01); *C01G 53/006* (2013.01); *C01G 53/04* (2013.01);
(Continued)

(58) Field of Classification Search
CPC ... H01M 4/505; H01M 4/525; C01P 2004/51; C01G 53/04; C01G 53/006; C01G 53/50
See application file for complete search history.

(56) References Cited

U.S. PATENT DOCUMENTS 6,153,334 A   11/2000  Sakamoto et al.
10,236,507 B2 *  3/2019  Yamaji ................... C01G 53/40
(Continued)

FOREIGN PATENT DOCUMENTS

JP    H11-317224 A    11/1999
JP    2011-116580 A    6/2011
(Continued)

OTHER PUBLICATIONS

Translation of Written Opinion (no date).*
(Continued)

*Primary Examiner* — Amanda C. Walke
(74) *Attorney, Agent, or Firm* — Westerman, Hattori, Daniels & Adrian, LLP

(57) ABSTRACT

Provided are a positive electrode active material with which a nonaqueous electrolyte secondary battery having a high energy density can be obtained, a nickel-manganese composite hydroxide suitable as a precursor of the positive electrode active material, and production methods capable of easily producing these in an industrial scale. Provided is a nickel-manganese composite hydroxide represented by General Formula (1): $Ni_xMn_yM_z(OH)_{2+\alpha}$ and containing a secondary particle formed of a plurality of flocculated primary particles. The nickel-manganese composite hydrox- (Continued)

ide has a half width of a diffraction peak of a (001) plane obtained by X-ray diffraction measurement of at least 0.10° and up to 0.40° and has a degree of sparsity/density represented by [(void area within secondary particle/cross section of secondary particle)×100](%) of at least 0.5% and up to 10%. Also provided is a production method of the nickel-manganese composite hydroxide.

5 Claims, 10 Drawing Sheets

(51) Int. Cl.
    *C01G 53/00*     (2006.01)
    *C01G 53/04*     (2006.01)
    *H01M 10/0525*     (2010.01)
    *H01M 4/86*     (2006.01)

(52) U.S. Cl.
    CPC ............ *C01G 53/50* (2013.01); *H01M 4/525* (2013.01); *C01P 2002/72* (2013.01); *C01P 2002/74* (2013.01); *C01P 2004/51* (2013.01); *C01P 2004/61* (2013.01); *C01P 2006/11* (2013.01); *C01P 2006/12* (2013.01); *C01P 2006/14* (2013.01); *C01P 2006/19* (2013.01); *C01P 2006/40* (2013.01); *H01M 10/0525* (2013.01); *H01M 2004/8689* (2013.01)

(56) References Cited

U.S. PATENT DOCUMENTS

| | | | |
|---|---|---|---|
| 2012/0270107 A1 | 10/2012 | Toya et al. | |
| 2014/0106228 A1 | 4/2014 | Toya et al. | |
| 2015/0364761 A1 | 12/2015 | Fukui et al. | |
| 2016/0028073 A1* | 1/2016 | Ohara | H01M 50/116 429/162 |
| 2016/0036041 A1* | 2/2016 | Uwai | H01M 10/052 429/223 |
| 2016/0036044 A1* | 2/2016 | Ohara | H01M 4/525 429/223 |
| 2016/0118662 A1 | 4/2016 | Schroedle et al. | |
| 2016/0133927 A1 | 5/2016 | Kamata et al. | |
| 2016/0172674 A1* | 6/2016 | Oda | H01M 4/505 429/223 |
| 2016/0218362 A1* | 7/2016 | Kagei | C01G 53/50 |
| 2016/0244336 A1 | 8/2016 | Toya et al. | |
| 2016/0248091 A1 | 8/2016 | Toya et al. | |
| 2017/0012288 A1 | 1/2017 | Yamaji et al. | |
| 2017/0288215 A1* | 10/2017 | Mitsumoto | H01M 4/366 |
| 2017/0338485 A1 | 11/2017 | Toya et al. | |
| 2018/0175387 A1* | 6/2018 | Kim | H01M 4/133 |
| 2018/0002050 A1 | 7/2018 | Toya et al. | |
| 2018/0190983 A1 | 7/2018 | Fukui et al. | |
| 2018/0205080 A1 | 7/2018 | Toya et al. | |
| 2019/0252681 A1* | 8/2019 | Kaneda | H01M 10/0525 |
| 2019/0260024 A1* | 8/2019 | Nakamura | H01M 4/505 |
| 2019/0296348 A1* | 9/2019 | Kaneda | C01G 53/50 |
| 2020/0335781 A1* | 10/2020 | Oshita | H01M 4/131 |
| 2020/0358093 A1* | 11/2020 | Oshita | G01N 21/71 |

FOREIGN PATENT DOCUMENTS

| | | |
|---|---|---|
| JP | 2012-252844 A | 12/2012 |
| JP | 2013-144625 A | 7/2013 |
| JP | 2015-002120 A | 1/2015 |
| JP | 2015-076397 A | 4/2015 |
| JP | 2016-004703 A | 1/2016 |
| JP | 2016-522147 A | 7/2016 |
| WO | 2012/169274 A1 | 12/2012 |
| WO | 2015/115547 A1 | 8/2015 |

OTHER PUBLICATIONS

International Search Report dated Sep. 5, 2017, issued in counterpart application No. PCT/JP2017/027538, with English translation. (4 pages).
International Preliminary Report on Patentability (Form PCT/IB/373) issued in counterpart International Application No. PCT/JP2017/027538 dated Jan. 29, 2019 with Form PCT/ISA/237, with English translation. (18 pages).
Office Action dated Jan. 25, 2022, issued in counterpart JP application No. 2018-530436, with English translation (10 pages).

* cited by examiner

US 11,296,316 B2

NICKEL-MANGANESE COMPOSITE HYDROXIDE, METHOD FOR PRODUCING THE SAME, POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

TECHNICAL FIELD

The present invention relates to a nickel-manganese composite hydroxide, a method for producing the same, a positive electrode active material for a nonaqueous electrolyte secondary battery, a method for producing the same, and a nonaqueous electrolyte secondary battery.

BACKGROUND ART

In recent years, with the proliferation of portable electronic equipment such as cellular phones and notebook personal computers, development of a nonaqueous electrolyte secondary battery with reduced size and weight having high energy density is intensely demanded. A representative example of such a nonaqueous electrolyte secondary battery is a lithium ion secondary battery. For a negative electrode active material of the lithium ion secondary battery, lithium metal, lithium alloys, metal oxides, carbon, and the like are being used. These materials are materials that can de-insert and insert lithium.

Currently, research and development of lithium ion secondary batteries are being energetically conducted. Among them, lithium ion secondary batteries using lithium-transition metal composite oxides, especially a lithium-cobalt composite oxide ($LiCoO_2$), which is relatively easily synthesized, for a positive electrode active material can obtain as high voltage as 4 V class and are thus expected as batteries having high energy density and are in practical use. Also being developed are a lithium-nickel composite oxide ($LiNiO_2$), a lithium-nickel-cobalt-manganese composite oxide ($LiNi_{0.33}Co_{0.33}Mn_{0.33}O_2$), and the like using nickel, which is lower in price than cobalt, as the positive electrode active material. Among them, the lithium-nickel-cobalt-manganese composite oxide attracts attention because of its excellent balance among battery capacity, output characteristics, durability, costs, and the like. However, it is inferior to lithium-nickel composite oxide-based ones in capacity, and a sufficient output characteristic and improvement of its battery capacity (energy density) are required.

Various developments have been made in response to the requirements to improve battery capacity in the positive electrode active material. Patent Literature 1 presents a positive electrode active material for a nonaqueous electrolyte secondary battery having an average particle diameter of 2 to 8 μm and [(D90−D10)/an average particle diameter] as an indicator indicating a spread of particle size distribution of up to 0.60 in order to improve cycle characteristics and achieve high output, for example. Such an active material causes an electrochemical reaction to uniformly occur and has the advantages of high capacity and long life, but on the other hand, it is low in fillability of the positive electrode active material and is thus not high in volume energy density.

In addition, for example, Patent Literature 2 proposes a method for producing a positive electrode active material for a lithium ion battery, in which hydroxide raw material powder is crushed, and then slurry including the crushed raw material powder having a specific particle size distribution is prepared, and after nearly spherically granulated powder is prepared by using this slurry and then mixed with a lithium compound, the granulated powder is caused to react with the lithium compound by firing. It is reported that with this method the positive electrode active material having a desired void rate and a high open pore ratio thereby providing excellent battery characteristics can be obtained. However, this method requires a process in which after the obtained hydroxide is crushed, it is granulated again so as to obtain a precursor; and thus, in this method there is a problem in productivity. In addition, when the open pore ratio is increased, even though the battery characteristics can be improved, there is a problem in that a volume energy density decreases.

Furthermore, Patent Literature 3 presents a nickel-cobalt-manganese composite hydroxide obtained by being precipitated by holding an aqueous solution containing a nickel salt, a cobalt salt, and a manganese salt at least pH 10 and up to pH 13 in an atmosphere of a mixture gas of an inert gas and an oxygen gas with a volume ratio relative to the inert gas of at least 0.5% and up to 3.0% and a positive electrode active material for a nonaqueous electrolyte secondary battery obtained by firing a mixture of the composite hydroxide and a lithium compound, for example. It is said that with this, the tap density and the bulk density of the nickel-cobalt-manganese composite hydroxide can be improved, the positive electrode active material and a precursor thereof can be increased in density, and the capacity of a nonaqueous electrolyte secondary battery can be further improved. However, although battery capacity is studied, other battery characteristics have not been fully studied.

Patent Literature 4 proposes a positive electrode active material for a nonaqueous secondary battery in which the material has the average particle diameter of more than 8 μm and up to 16 μm and includes a shell portion with [(D90−D10)/average particle diameter] that is an indicator to represent a spread of the particle size distribution of up to 0.60 and a hollow portion inside the shell portion. It is reported that this positive electrode active material has a uniform particle size distribution and a high fillability, and that this can decrease a positive electrode resistance value. However, there is a problem in the hollow particle that the fillability decreases even though a high output characteristic can be obtained. Here, the shape of the primary particle of the hydroxide is controlled by switching the atmosphere during the time of crystallization, which requires the time for switching; and thus, there is also a problem of lowered productivity.

Patent Literature 5 proposes a method for producing a nickel-manganese composite hydroxide particle, in which a raw material aqueous solution containing at least nickel and manganese, an aqueous solution including an ammonium-ion-providing body, and an alkali solution are fed into a reaction vessel, and they are mixed to form a reaction aqueous solution; and during the time when the nickel-manganese composite hydroxide particles are crystallized out, an oxygen concentration inside the reaction vessel is made up to 3.0% by volume, a temperature of the reaction aqueous solution is controlled in the range of 35 to 60° C., and a nickel concentration is controlled at at least 1,000 mg/L. It is reported that with this method, the circularity of the nickel-manganese composite hydroxide particle can be enhanced, so that the fillability of the positive electrode active material including the nickel-manganese composite hydroxide particle serving as a precursor can be enhanced. However, this proposal pays an attention only to the fillability that is enhanced by sphericity of the particle; and thus, there still remains a room for the study about the volume energy density.

CITATION LIST

Patent Literatures

[Patent Literature 1] Japanese Unexamined Patent Application Publication No. 2011-116580
[Patent Literature 2] Japanese Unexamined Patent Application Publication No. 2015-76397
[Patent Literature 3] Japanese Unexamined Patent Application Publication No. 2013-144625
[Patent Literature 4] International Publication No. WO 2012/169274
[Patent Literature 5] International Publication No. WO 2015/115547

SUMMARY OF INVENTION

Technical Problems

As described above, a further enhanced energy density is requested to the nonaqueous electrolyte secondary battery. Therefore, in order to respond to such a request, various positive electrode active materials have been proposed. However, as of today, the positive electrode active material that satisfies the requirements of a high volume energy density and a sufficient output characteristic by appropriately controlling the fillability and the battery capacity has not been developed yet. It has been known that the fillability and the battery capacity of the positive electrode active material can be improved, for example, by compatibly satisfying, in a high level, the tap density and the specific surface area of a composite hydroxide, which is a precursor of the positive electrode active material; and thus, a method for producing the composite hydroxide (precursor) is also investigated extensively. However, as of today, the method for producing, in an industrial scale, the composite hydroxide (precursor) capable of sufficiently enhancing the performance of a lithium ion secondary battery has not been developed yet. Accordingly, there is a demand to develop the methods for producing a positive electrode active material that has a high volume energy density and a sufficient output characteristic and a composite hydroxide that is a precursor thereof at low cost and on a large scale.

In view of the problems as described above, the present invention intends to provide: a positive electrode active material with which a nonaqueous electrolyte secondary battery having a high energy density and a sufficient output characteristic as a secondary battery can be produced; and a nickel-manganese composite hydroxide that is suitable as a precursor thereof. In addition, the present invention intends to provide a method for easily producing a nickel-manganese composite hydroxide and a method for producing a positive electrode active material for a nonaqueous electrolyte secondary battery by using this nickel-manganese composite hydroxide, both in an industrial scale.

Solution to Problems

A first aspect of the present invention provides a nickel-manganese composite hydroxide, in which the nickel-manganese composite hydroxide is represented by General Formula (1): $Ni_xMn_yM_z(OH)_{2+\alpha}$ (in Formula (1), M is at least one element selected from Co, Ti, V, Cr, Zr, Nb, Mo, Hf, Ta, Fe, and W; and x, y, z, and $\alpha$ satisfy $0.1 \leq x \leq 0.9$, $0.05 \leq y \leq 0.8$, $0 \leq z \leq 0.8$, $x+y+z=1.0$, and $0 \leq \alpha \leq 0.4$) and contains a secondary particle formed of a plurality of flocculated primary particles. The nickel-manganese composite hydroxide has a half width of a diffraction peak of a (001) plane obtained by X-ray diffraction measurement of at least 0.10° and up to 0.40° and has a degree of sparsity/density represented by [(void area within secondary particle/cross section of secondary particle)×100](%) of at least 0.5% and up to 10%.

In addition, in the nickel-manganese composite hydroxide, it is preferable that a pore volume that is measured by a nitrogen adsorption method be at least 0.01 $cm^3/g$ and up to 0.04 $cm^3/g$. In addition, in the nickel-manganese composite hydroxide, it is preferable that [(D90−D10)/average particle diameter] that is an indicator to represent a spread of particle size distribution be at least 0.7, and a volume-average particle diameter MV be at least 5 μm and up to 20 μm. In addition, in the nickel-manganese composite hydroxide, it is preferable that a specific surface area be at least 5 $m^2/g$ and up to 15 $m^2/g$. In addition, in the nickel-manganese composite hydroxide, it is preferable that a tap density be at least 1.8 $g/cm^3$ and up to 2.5 $g/cm^3$.

A second aspect of the present invention provides a nickel-manganese composite hydroxide represented by General Formula (1): $Ni_xMn_yM_z(OH)_{2+\alpha}$ (in Formula (1), M is at least one element selected from Co, Ti, V, Cr, Zr, Nb, Mo, Hf, Ta, Fe, and W; x satisfies $0.1 \leq x \leq 0.9$, y satisfies $0.05 \leq y \leq 0.8$, z satisfies $0 \leq z \leq 0.8$, and $x+y+z=1.0$; and a satisfies $0 \leq \alpha \leq 0.4$) and containing a secondary particle formed of a plurality of flocculated primary particles, the method including a crystallization process of generating a nickel-manganese composite hydroxide by neutralizing a salt containing at least nickel and a salt containing at least manganese in a reaction aqueous solution, in the crystallization process, a dissolved oxygen concentration in the reaction aqueous solution being adjusted to fall within a range of at least 0.2 mg/L and up to 4.6 mg/L, and a dissolved nickel concentration in the reaction aqueous solution being adjusted to fall within a range of at least 700 mg/L and up to 1,500 mg/L.

In addition, in the crystallization process, it is preferable that a stirring power loaded to the reaction aqueous solution be adjusted to fall within a range of at least 3 $kW/m^3$ and up to 15 $kW/m^3$. In addition, in the crystallization process, it is preferable that a temperature of the reaction aqueous solution be adjusted to fall within a range of at least 35° C. and up to 60° C. In addition, in the crystallization process, it is preferable that a pH value measured based on a temperature of the reaction aqueous solution at 25° C. be adjusted to fall within a range of at least 10.0 and up to 13.0. In addition, the crystallization process preferably includes continuously adding a mixed aqueous solution including nickel and manganese into a reaction vessel and overflowing slurry including nickel-manganese composite hydroxide particles formed by neutralization to recover the secondary particle.

A third aspect of the present invention provides a positive electrode active material for a nonaqueous electrolyte secondary battery, the positive electrode active material including a lithium-nickel-manganese composite oxide represented by General Formula (2): $Li_{1+t}Ni_xMn_yM_zO_{2+\beta}$ (in Formula (2), M is at least one additional element selected from Co, Ti, V, Cr, Zr, Nb, Mo, Hf, Ta, Fe, and W; t satisfies $-0.05 \leq t \leq 0.5$, x satisfies $0.1 \leq x \leq 0.9$, y satisfies $0.05 \leq y \leq 0.8$, z satisfies $0 \leq z \leq 0.8$, and $x+y+z=1.0$; and $\beta$ satisfies $0 \leq \beta \leq 0.5$) and containing a secondary particle formed of flocculated primary particles, the positive electrode active material for a nonaqueous electrolyte secondary battery having a degree of sparsity/density represented by [(void area within secondary particle/cross section of secondary particle)×100] (%) of at least 0.5% and up to 12% and having a DBP absorption amount measured in compliance with JIS K6217-4 of at least 12 cm$^3$/100 g and up to 20 cm$^3$/100 g.

In addition, it is preferable that a tap density is at least 2.0 g/cm$^3$ and up to 2.7 g/cm$^3$. In addition, it is preferable that a ratio I(003)/I(104) of a diffraction peak intensity I(003) of a 003 plane to a peak intensity I(104) of a 104 plane, obtained by X-ray diffraction measurement, be at least 1.7. In addition, when an arbitrary radial direction from a center of a cross section of the secondary particle toward an outside thereof is regarded as an x-axis direction and a direction perpendicular to the x-axis direction is regarded as a y-axis direction, it is preferable that an orientation rate of a crystal ab plane measured by an electron backscatter diffraction method be at least 55% in each of the x-axis direction and the y-axis direction.

A fourth aspect of the present invention provides a method for producing a positive electrode active material for a nonaqueous electrolyte secondary battery represented by General Formula (2) Li$_{1+t}$Ni$_x$Mn$_y$M$_z$O$_{2+\beta}$ (in Formula (2), M is at least one additional element selected from Co, Ti, V, Cr, Zr, Nb, Mo, Hf, Ta, Fe, and W; t satisfies −0.05≤t≤0.5, x satisfies 0.1≤x≤0.9, y satisfies 0.05≤y≤0.8, z satisfies 0≤z≤0.8, and x+y+z=1.0; and β satisfies 0≤β≤0.5) and containing a secondary particle formed of flocculated primary particles, the method including a process of obtaining a mixture by mixing the nickel-manganese composite hydroxide and a lithium compound together and a process of obtaining a lithium-nickel-manganese composite oxide by firing the mixture.

It is preferable that the nickel-manganese composite hydroxide be obtained by the above-described production method of the nickel-manganese composite hydroxide.

A fifth aspect of the present invention provides a nonaqueous electrolyte secondary battery containing the positive electrode active material for a nonaqueous electrolyte secondary battery in a positive electrode.

Advantageous Effects of the Invention

With the positive electrode active material of the present invention, a nonaqueous electrolyte secondary battery having a high energy density and a sufficient output characteristic as a secondary battery can be obtained. In addition, the nickel-manganese composite hydroxide of the present invention has an excellent fillability, so that this can be suitably used as the precursor of the positive electrode active material. In addition, with the methods of the present invention to produce the nickel-manganese composite hydroxide and the positive electrode active material, these can be produced easily in an industrial scale; and thus, it can be said that industrial values thereof are very high.

DESCRIPTION OF EMBODIMENTS

Figure 1:
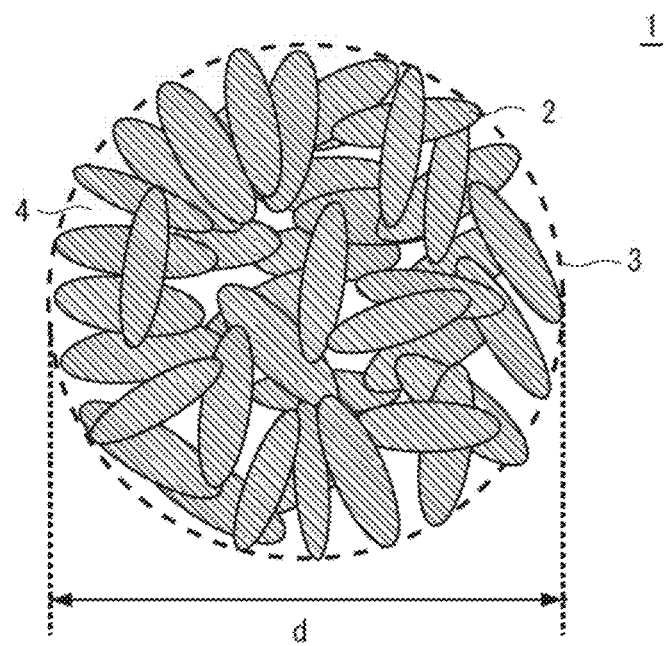
FIG. 1 is a schematic drawing that illustrates one example of the nickel-manganese composite hydroxide of the present embodiment.

The following describes details of a nickel-manganese composite hydroxide, a method for producing the same, a positive electrode active material for a nonaqueous electrolyte secondary battery, and a method for producing the same of the present embodiment with reference to the accompanying drawings. In the drawings, to make components easier to understand, they are illustrated with a part emphasized or with a part simplified, and actual structures or shapes, a reduced scale, and the like may be different.

(1) Nickel-Manganese Composite Hydroxide

FIG. 1 is a schematic diagram of an exemplary nickel-manganese composite hydroxide of the present embodiment. As illustrated in FIG. 1, this nickel-manganese composite hydroxide 1 (hereinafter, also referred to as a "composite hydroxide 1") is containing a secondary particle 3 formed of a plurality of flocculated primary particles 2. The secondary particle 3 has a void 4 among the primary particles 2. Although the composite hydroxide 1 mainly includes the secondary particle 3 formed of the flocculated primary particles 2, it may contain a small number of primary particles 2 such as a primary particle 2 that has not been flocculated as the secondary particle 3 and a primary particle 2 that has fallen from the secondary particle 3 after being flocculated.

In the composite hydroxide 1 of the present embodiment, as will be described later, during the crystallization reaction, the dissolved oxygen concentration and the dissolved nickel concentration in the reaction aqueous solution, and also preferably the stirring power therein are adjusted so as to control the crystallinity and the degree of sparsity/density in specific respective ranges; and thus, the nonaqueous electrolyte secondary battery (hereinafter, this is also referred to as "secondary battery") including the positive electrode active material for a nonaqueous electrolyte secondary battery (hereinafter, this material is also referred to as "positive electrode active material") using this composite hydroxide 1 as the precursor thereof can have a very high energy density as well as a sufficient output characteristic as the secondary battery.

The composite hydroxide 1 is represented by General Formula (1): Ni$_x$Mn$_y$M$_z$(OH)$_{2+\alpha}$. In Formula (1), M is at least one additional element selected from Co, Ti, V, Cr, Zr, Nb, Mo, Hf, Ta, Fe, and W; x satisfies 0.1≤x≤0.9, y satisfies $0.05 \leq y \leq 0.8$, z satisfies $0 \leq z \leq 0.8$, $\alpha$ satisfies $0 \leq \alpha \leq 0.4$, and $x+y+z=1.0$. In Formula (1), $\alpha$ is a coefficient that changes in accordance with the valence number of the metal elements contained in the composite hydroxide 1.

In Formula (1), when y indicating the content of Mn in the composite hydroxide 1 is within the above range, the morphology of the primary particles 2 can be adjusted in accordance with the dissolved oxygen concentration in the reaction aqueous solution in the crystallization process, whereby the degree of sparsity/density can be controlled to fall within a desired range. In view of controlling the degree of sparsity/density more precisely, y preferably satisfies $0.1 \leq y \leq 0.8$. When the value of y is at least 0.1, the degree of sparsity/density of the secondary particle 3 can be controlled at a lower dissolved oxygen concentration, and thus excessive oxidation of transition metals can be prevented. When in Formula (1) z indicating the content of M is greater than 0, requirements for various battery characteristics can be satisfied. M containing Co gives more excellent battery capacity and output characteristics, for example. When M is Co, z preferably satisfies $0.1 \leq z \leq 0.4$.

The half width of the diffraction peak of the (001) plane obtained from the XRD measurement of the composite hydroxide 1 is at least 0.10° and up to 0.40°, and preferably at least 0.20° and less than 0.40°. The half width of the (001) plane is a factor to influence the size and orientation of the crystallite that constitutes the composite hydroxide 1. When the half width of the (001) plane is within the range described above, the primary particles have a high crystallinity, and in addition, an appropriate orientation; and thus, the secondary particle thereof can be made to have a dense structure so that the positive electrode active material using this hydroxide can have a high energy density and can retain a sufficient output characteristic as the secondary battery. When the half width of the (001) plane is less than 0.10°, the crystallinity thereof is too high that the reactivity with a Li compound upon obtaining the positive electrode active material is decreased; and thus, the positive electrode active material having desired characteristics cannot be obtained. On the other hand, when the half width of the (001) plane is more than 0.40°, the positive electrode active material obtained from the composite hydroxide 1 is prone to be a sparse particle (secondary particle 3 having a high degree of sparsity/density), or the orientation of the primary particle of the positive electrode active material may decrease. Note that the diffraction peak of the (001) plane appears near $2\theta=19°$ ($2\theta=19\pm1°$).

In the composite hydroxide 1, the degree of sparsity/density measured from the image of the cross section of the secondary particle thereof by means of a scanning electron microscope (SEM) is at least 0.5% and up to 10%, and preferably at least 0.5% and up to 8%. When the degree of sparsity/density is within the range described above, the positive electrode active material having excellent battery capacity and fillability, as well as a further enhanced volume energy density and a sufficient output characteristic can be obtained. On the other hand, when the degree of sparsity/density is less than 0.5%, penetration of the Li compound into the particle is insufficient during the time of preparing the positive electrode active material; and thus, the reactivity with the lithium compound may decrease. When the degree of sparsity/density is more than 10%, the volume energy density may decrease.

Here, "degree of sparsity/density" is the value obtained from the result of the image analysis of the cross section of the particle of composite hydroxide 1 by using a scanning electron microscope (SEM), and this is the value represented by [(area of the void 4 inside the secondary particle 3/area of the cross section of the secondary particle 3)×100](%). For example, in the cross section of the composite hydroxide 1 depicted in FIG. 1, the degree of sparsity/density is the value represented by [(area of the void 4)/(sum of the area of the cross section of the primary particle 2 and the area of void 4)×100]. Namely, the higher the degree of sparsity/density is, the sparser is the structure inside the secondary particle 3; and the lower the degree of sparsity/density is, the denser is the structure inside the secondary particle 3. Here, as the degree of sparsity/density, an average degree of sparsity/density can be used, in which this can be obtained in such a way that the cross sections of 20 secondary particles 3 that are at least 80% of the volume-average particle diameter (MV) are randomly selected, and the degree of sparsity/density of each cross section of the secondary particles 3 is measured followed by averaging the respective values.

In the composite hydroxide 1, the pore volume that is measured by a nitrogen adsorption method is preferably at least 0.01 cm³/g and up to 0.04 cm³/g. When the pore volume is less than 0.01 mL/g, penetration of the Li compound into the particle during the time of obtaining the positive electrode active material is insufficient, so that the reactivity with the lithium compound may decrease. When the pore volume is within the range described above, an excellent fillability and a suitable output characteristic as the positive electrode active material 10 can be obtained.

The particle diameter of the composite hydroxide 1 is not particularly limited, so that any of the desired range thereof may be allowed. When this is used for a precursor of the positive electrode active material, the volume average particle diameter MV is preferably at least 5 μm and up to 20 μm and more preferably at least 6 μm and up to 15 μm. When the average particle diameter is less than 5 Cm, the fillability of the particle of the composite hydroxide 1 significantly decreases, so that it may be difficult to increase the battery capacity per volume when this is made into the positive electrode active material. On the other hand, when the average particle is more than 20 μm, because the specific surface area decreases, the reactivity with the lithium raw material upon making the positive electrode active material decreases, so that the positive electrode active material having good battery characteristics may not be obtained. In the obtained positive electrode active material, the interface with the electrolyte solution decreases thereby leading to an increase in the positive electrode resistance, so that the output characteristic of the battery may deteriorate.

In the composite hydroxide 1, it is preferable that [(D90−D10)/average particle diameter] that is an indicator to represent a spread of the particle size distribution be at least 0.7. When [(D90−D10)/average particle diameter] is less than 0.7, uniformity of the particle diameter is enhanced thereby tending to increase the charging and discharging capacities per mass (hereinafter, this is also referred to as "battery capacity"); but the particle fillability may decrease thereby leading to a decrease in the volume average density. The [(D90−D10)/average particle diameter] may be adjusted within the range described above, for example, by mixing the composite hydroxide 1 having different particle diameters, or by producing the composite hydroxide 1 by a continuous crystallization method. Here, the upper limit of [(D90−D10)/average particle diameter] is not particularly limited, while in view of suppressing excessive contamination of fine particles or coarse particles into the positive electrode active material, the upper limit thereof is preferably, for example, up to 1.2 and more preferably up to 1.0.

In [(D90−D10)/the average particle diameter], D10 means a particle diameter at which, when the numbers of particles of the respective particle diameters are accumulated from a smaller particle diameter, the accumulated volume reaches 10% of the total volume of all the particles, and D90 means a particle diameter at which, when the numbers of particles are accumulated similarly, the accumulated volume reaches 90% of the total volume of all the particles. The average particle diameter is the volume-average particle diameter MV, which means an average particle diameter weighted in terms of volume. The volume-average particle diameter MV, and D90 and D10 can be measured using a laser diffraction/scattering particle size analyzer.

The specific surface area of the composite hydroxide 1 is preferably in the range of at least 2.5 $m^2/g$ and up to 50 $m^2/g$ and more preferably in the range of at least 5 $m^2/g$ and up to 15 $m^2/g$. When the specific surface area is within the range described above, the positive electrode active material using the composite hydroxide 1 as the precursor can have further enhanced battery characteristics and fillability. The specific surface area may be brought within the range described above by adjusting the degree of sparsity/density and the particle distribution including the average particle diameter MV of the composite hydroxide 1.

A tap density of the composite hydroxide 1 is preferably within a range of at least 1.8 $g/cm^3$ and up to 2.5 $g/cm^3$ and more preferably of at least 1.9 $g/cm^3$ and up to 2.5 $g/cm^3$. When the tap density is within the above range, the positive electrode active material using the composite hydroxide 1 as a precursor is more excellent in fillability, achieving improvement in battery capacity. The tap density can be made within the above range by adjusting the particle size distribution including the average particle diameter MV or the degree of sparsity/density of the composite hydroxide 1.

(2) Method for Producing Nickel-Manganese Composite Hydroxide

Figure 2:
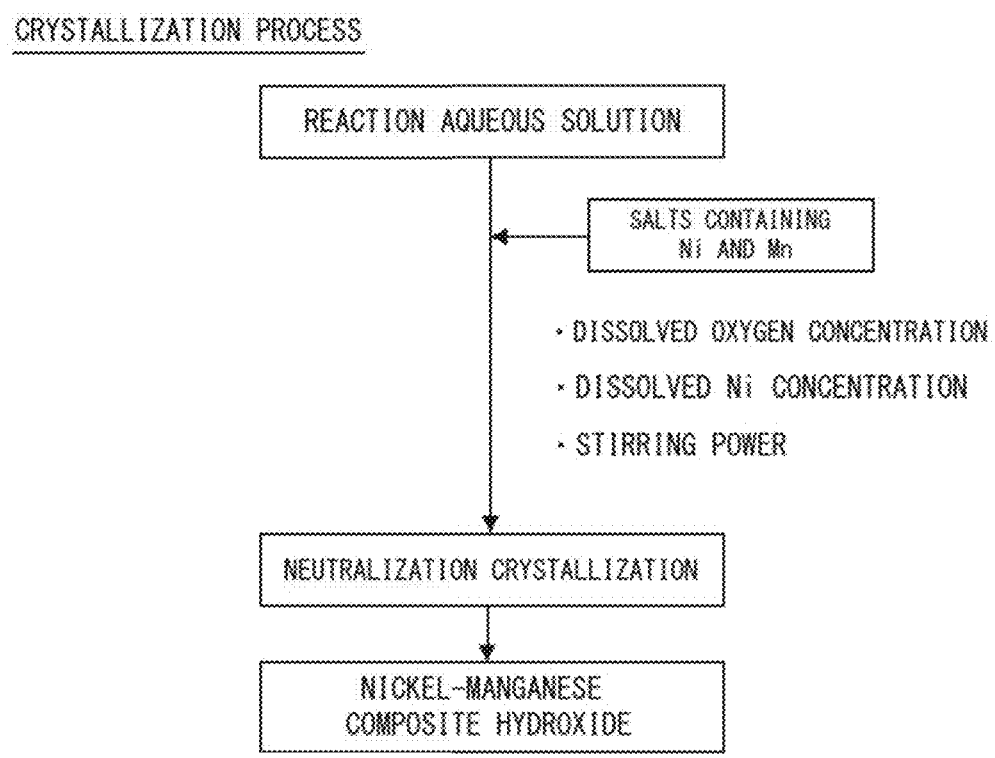
FIG. 2 is a drawing that illustrates one example of the production method of the nickel-manganese composite hydroxide of the present embodiment.

FIG. 2 is a diagram of an exemplary method for producing a nickel-manganese composite hydroxide of the present embodiment. In the following, in describing FIG. 2, FIG. 1, which is a schematic diagram of an exemplary composite hydroxide 1, is referred to as appropriate.

As illustrated in FIG. 2, the production method of the composite hydroxide 1 of the present embodiment includes the crystallization process in which a salt containing at least nickel and a salt containing at least manganese are neutralized to effect the co-precipitation in the reaction aqueous solution in a crystallization reaction vessel. In the present embodiment, during the crystallization process, it is important to adjust the dissolved nickel concentration and the dissolved oxygen concentration in the reaction aqueous solution to fall within the specific ranges. By adjusting these factors (parameters), each of the particle diameter d of the secondary particle 3 to be obtained and the degree of sparsity/density inside the secondary particle 3 can be controlled. In addition, by adjusting the stirring power loaded to the reaction aqueous solution, crystallinity of the secondary particle 3 and the degree of sparsity/density inside the particle 3 can be controlled further precisely.

The inventors of the present invention intensively studied production conditions of the composite hydroxide 1 and have found out that the morphology of the primary particles 2 and the secondary particle 3 can be accurately controlled by adjusting the dissolved oxygen concentration and the dissolved nickel concentration in the reaction aqueous solution. That is to say, the method of production of the present embodiment can produce a composite hydroxide 1 used suitably also as the precursor of the positive electrode active material by adjusting the dissolved nickel concentration to fall within the specific ranges in accordance with the dissolved oxygen concentration. The "morphology" refers to characteristics related to the form and structure of the primary particles 2 and/or the secondary particle 3 including the shape, the degree of sparsity/density, the average particle diameter, the particle size distribution, the crystal structure, and the tap density of the particles.

In the production method of the composite hydroxide 1 of the present embodiment, when the dissolved oxygen concentration in the reaction aqueous solution is adjusted within a comparatively low range, and further the dissolved nickel concentration is adjusted within a comparatively high range, the crystallization rate of the primary particle 2 decreases; and thus, by increasing the thickness of the primary particle 2 so as to fill the void 4 among the primary particles 2, the secondary particle 3 having a dense structure can be formed. In addition, when the dissolved nickel concentration is adjusted within a high range, coarsening of the particle diameter of the secondary particle 3 can be suppressed.

Furthermore, the method for producing the composite hydroxide 1 of the present embodiment controls a flocculated state of the primary particles 2 by stirring power in the reaction aqueous solution, whereby the particle diameter of the secondary particle 2 can be controlled more accurately in a wide range. That is to say, when the dissolved oxygen concentration is adjusted to fall within a low range, the stirring power is controlled to fall within a high range, whereby coarse growth of the secondary particle 3 due to the flocculation of the primary particles 2 can be inhibited. In addition, the secondary particle 3 is inhibited from increasing in diameter, whereby the precipitation of the composite hydroxide within the secondary particle 3 is facilitated, and the secondary particle 3 can be made denser. The following describes conditions on the method the method for producing the composite hydroxide 1 of the present embodiment.

(Dissolved Oxygen Concentration)

The dissolved oxygen concentration in the reaction aqueous solution is adjusted in the range of at least 0.2 mg/L and up to 4.6 mg/L. When the dissolved oxygen concentration is controlled to fall within the range described above, by controlling the degree of sparsity/density of the secondary particle 3 within the range described above, the composite hydroxide that is suitable as the precursor of the positive electrode active material can be obtained. In addition, in the crystallization process, it is preferable that the dissolved oxygen concentration be controlled to fall within a certain range. The fluctuation width of the dissolved oxygen concentration is preferably, for example, within ±0.2 mg/L and more preferably within ±0.1 mg/L.

Figure 5:
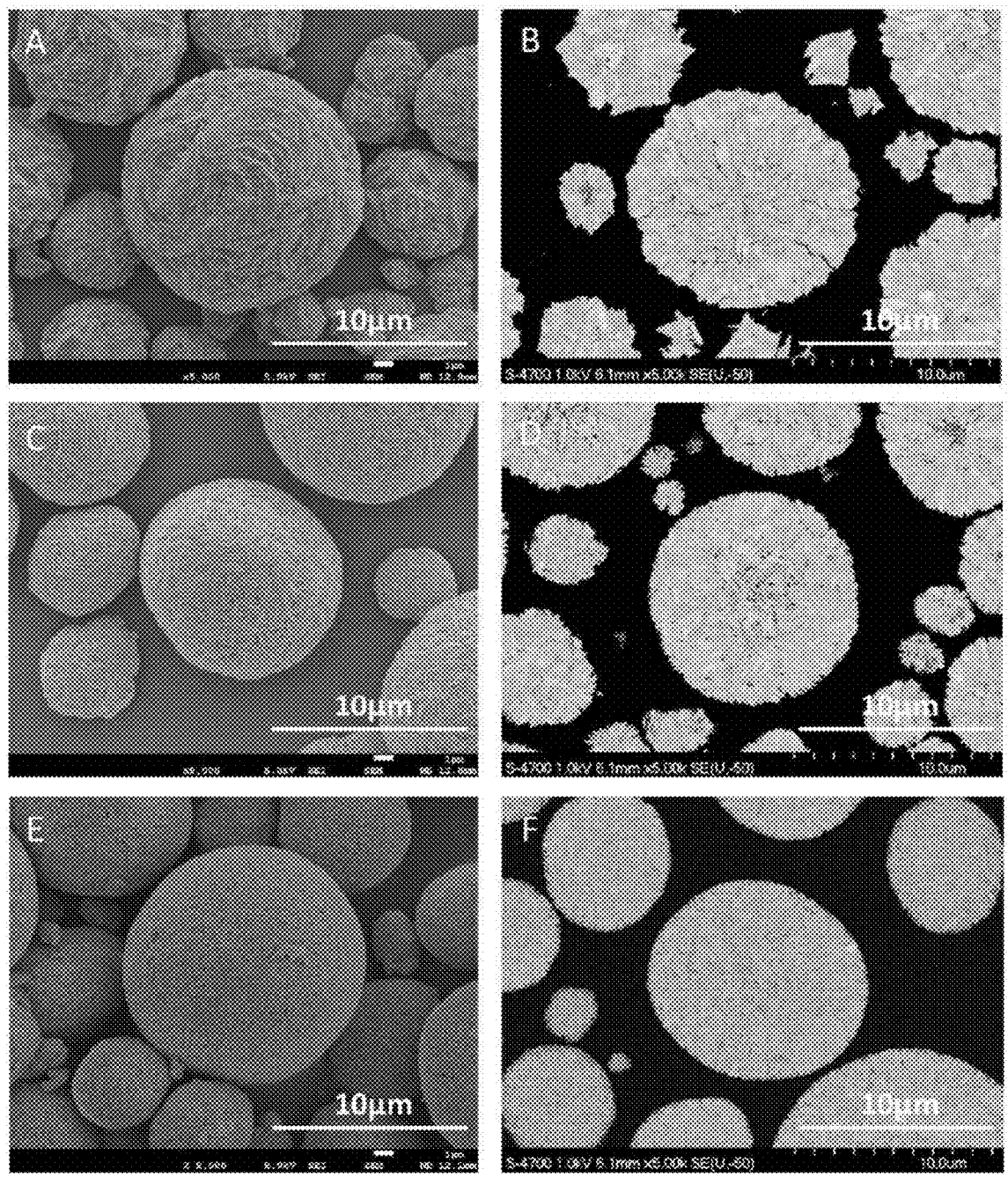
FIG. 5 includes pictures that illustrate one example of outer appearances and cross sections of the nickel-manganese composite hydroxide of the present embodiment.

When the dissolved oxygen concentration is within the range described above, the composite hydroxide 1 having a dense structure and a high filling density (tap density) as can be seen in, for example, FIG. 5A and FIG. 5B, can be obtained. Because the positive electrode active material that is produced using this composite hydroxide 1 has a high filling density, a high battery capacity can be obtained. When the dissolved oxygen concentration is less than 0.2 mg/L, oxidation of the transition metals, especially oxidation of manganese, hardly takes place; as a result, inside the secondary particle 3 becomes extremely dense. In addition, the surface thereof may have a peculiar form. In the positive electrode active material obtained by using the composite hydroxide like this, the reaction resistance increases and the output characteristic deteriorates. On the other hand, when the dissolved oxygen concentration is more than 4.6 mg/L, the secondary particle thereby produced has a further sparse structure.

Here, the dissolved oxygen concentration may be measured by a method such as a Winkler method (chemical analysis method), a diaphragm permeation method (electrochemical measurement method), or a fluorescence measurement method. The same measurement value of the dissolved oxygen concentration can be obtained with these measurement methods; and thus, any method mentioned above may be used. The dissolved oxygen concentration in the reaction aqueous solution can be adjusted by introducing into a reaction vessel a gas such as, for example, an inert gas (for example, $N_2$ gas and Ar gas), an air, or oxygen, with controlling the flow rates or the composition of these gases. Here, these gases may be flowed into the space of the reaction vessel or blown into the reaction aqueous solution. By appropriately stirring the reaction aqueous solution by using the stirring equipment such as a stirring blade with the power within the range to be described later, the dissolved oxygen concentration in the whole reaction aqueous solution can be made further uniform.

(Dissolved Nickel Concentration)

The dissolved nickel concentration in the reaction aqueous solution is adjusted, for example, in the range of at least 700 mg/L and up to 1,500 mg/L, and preferably in the range of at least 700 mg/L and up to 1,200 mg/L, based on the temperature of the reaction aqueous solution. When the dissolved nickel concentration is appropriately adjusted within the range described above, the average particle diameter and the degree of sparsity/density can be controlled to fall within the desired respective ranges, so that the nickel-manganese composite hydroxide having a low degree of sparsity/density and a high sphericity as the precursor of the positive electrode active material can be easily obtained. In addition, in the crystallization process, it is preferable to control the dissolved nickel concentration so as to be within a certain range. It is preferable that the fluctuation range of the dissolved nickel concentration be, for example, within ±20 mg/L. The dissolved nickel concentration may be measured, for example, by chemically analyzing the Ni amount in a liquid component of the reaction aqueous solution with an ICP emission spectrometry.

When the dissolved nickel concentration in the reaction aqueous solution is less than 700 mg/L, the growth rate of the primary particle 2 is so fast that there is a tendency that the nucleus generation is dominant over the particle growth, so that the degree of sparsity/density of the secondary particle is prone to become higher than the range described above. On the other hand, when the dissolved nickel concentration is more than 1,500 mg/L, the generation rate of the composite hydroxide 1 (secondary particle 3) becomes extremely slow so that nickel remains in the filtrate thereby occasionally causing significant deviation of the composition of the obtained composite hydroxide 1 from the target values thereof. In addition, under the condition that the dissolved nickel concentration is too high, impurities included in the composite hydroxide 1 significantly increase thereby occasionally causing deterioration of the battery characteristics when the positive electrode active material obtained from the composite hydroxide is used in the battery.

(Stirring Power)

The stirring power loaded to the reaction aqueous solution is adjusted preferably in the range of at least 3 kW/m$^3$ and up to 15 kW/m$^3$, more preferably in the range of at least 3 kW/m$^3$ and up to 14 kW/m$^3$, and far preferably in the range of at least 4.5 kW/m$^3$ and up to 12 kW/m$^3$. When the stirring power is made within the range described above, excessive refinement or coarsening of the secondary particle can be suppressed, so that the particle diameter of the composite hydroxide 1 can be made further suitable as the positive electrode active material. In addition, by suppressing coarsening of the secondary particle, the secondary particle can be made further dense. In the crystallization process, it is preferable to control the stirring power so as to be within a certain range. The fluctuation width of the stirring power may be made, for example, within ±0.2 kW/m$^3$. Alternatively, the stirring power may be adjusted, for example, in the range of up to 7 kW/m$^3$, or in the range of up to 6.5 kW/m$^3$. The stirring power is adjusted to fall within the range described above by adjusting the size, the rotation number, and the like of the stirring equipment such as a stirring blade disposed in the reaction vessel.

When the stirring power is less than 3 kW/m$^3$, the primary particles 2 are prone to be flocculated, so that the coarsened secondary particle 3 may be formed. With this, the fillability of the positive electrode active material may decrease. On the other hand, when the stirring power is more than 15 kW/m$^3$, flocculation of the primary particles is prone to be excessively suppressed, so that the secondary particle 3 becomes too small, thereby occasionally resulting in decrease of the fillability of the positive electrode active material.

(Reaction Temperature)

The temperature of the reaction aqueous solution in the crystallization reaction tank is preferably within a range of at least 35° C. and up to 60° C. and more preferably within a range of at least 38° C. and up to 50° C. When the temperature of the reaction aqueous solution is greater than 60° C., the degree of priority of nucleation increases over particle growth in the reaction aqueous solution, and the shape of the primary particles 2 forming the composite hydroxide 1 is likely to be extremely fine. Use of such a composite hydroxide 1 causes a problem in that the fillability of the positive electrode active material to be obtained degrades. In contrast, when the temperature of the reaction aqueous solution is less than 35° C., particle growth tends to be preferential over nucleation in the reaction aqueous solution, and the shapes of the primary particles 2 and the secondary particle 3 forming the composite hydroxide 1 are likely to increase in size. Use of the composite hydroxide having such a coarse secondary particle 3 as the precursor of the positive electrode active material causes a problem in that the positive electrode active material containing so extremely large coarse particles that irregularities occur during electrode production is formed. Furthermore, the reaction aqueous solution being less than 35° C. causes a problem in that a remaining amount of metal ions in the reaction aqueous solution is large, and reaction efficiency is extremely bad and is likely to cause a problem in that a composite hydroxide containing a large amount of impurity elements is generated.

(pH Value)

The pH value of the reaction aqueous solution is preferably within a range of at least 10.0 and up to 13.0 with a liquid temperature of 25° C. as a basis. When the pH value is within the above range, the morphology of the secondary particle is appropriately controlled while controlling the degree of sparsity/density by appropriately controlling the size and shape of the primary particles 2, and thus the composite hydroxide 1 more suitable as the precursor of the positive electrode active material can be obtained. When the pH value is less than 10.0, the generation rate of the composite hydroxide 1 is extremely lowered, nickel remains in the filtrate, and the composition of the composite hydroxide 1 to be obtained may be substantially deviated from the target value. In contrast, when the pH value is greater than 13.0, the growth rate of the particles is high, nucleation is likely to occur, and particles with a small diameter and less sphericity are likely to be formed.

(Others)

The method of production of the present embodiment includes the crystallization process that generates nickel-manganese composite hydroxide particles by neutralizing a salt containing at least nickel and a salt containing at least manganese in the reaction aqueous solution. As a specific embodiment of the crystallization process, a neutralizer (e.g., an alkali solution) is added to a mixed aqueous solution containing at least nickel (Ni) and manganese (Mn) in the reaction tank while stirring at a constant speed to perform neutralization, whereby pH is controlled, and the composite hydroxide 1 particle can be generated through coprecipitation, for example. The method of production of the present embodiment can employ any method of a batch type method of crystallization and a continuous method of crystallization. The continuous method of crystallization is a method of crystallization that supplies a neutralizer while continuously supplying the mixed aqueous solution to control pH and collects composite hydroxide particles generated by overflow. The continuous method of crystallization obtains particles having wider particle size distribution and easily obtains particles having higher fillability than the batch method. In addition, the continuous method of crystallization is suitable for mass production and is an advantageous method of production also industrially. When the composite hydroxide 1 of the present embodiment described above is produced by the continuous method of crystallization, for example, the fillability (tap density) of the composite hydroxide 1 particle to be obtained can be improved, and the composite hydroxide 1 having higher fillability and a degree of sparsity/density can be produced simply and in a large amount.

For the mixed aqueous solution, an aqueous solution containing at least nickel and manganese, that is to say, an aqueous solution dissolving at least a nickel salt and a manganese salt can be used. Furthermore, the mixed aqueous solution may contain M, and an aqueous solution dissolving a nickel salt, a manganese salt, and a salt containing M may be used. For a nickel salt, a manganese salt, a salt containing and M, at least one selected from the group consisting of sulfates, nitrates, and chlorides can be used, for example. Among them, sulfates are preferably used in view of costs and liquid-waste treatment.

The concentration of the mixed aqueous solution is preferably at least 1.0 mol/L and up to 2.4 mol/L and more preferably at least 1.2 mol/L and up to 2.2 mol/L in terms of the total of the dissolved metal salts. When the concentration of the mixed aqueous solution is less than 1.0 mol/L in terms of the total of the dissolved metal salts, the concentration is extremely low, and the primary particles 2 forming the composite hydroxide 1 (the secondary particle 3) may fail to sufficiently grow. In contrast, when the concentration of the mixed aqueous solution is greater than 2.4 mol/L, it is greater than a saturated concentration at room temperature, and crystals are reprecipitated, which may cause the risk of clogging of piping or the like. In addition, in this case, the nucleation amount of the primary particles 2 increases, and the proportion of fine particles within the composite hydroxide particles to be obtained may increase. The composition of the metal elements contained in the mixed aqueous solution matches the concentration of the metal elements contained in the composite hydroxide 1 to be obtained. Consequently, the composition of the metal elements of the mixed aqueous solution can be prepared so as to match the composition of the metal elements of the target composite hydroxide 1.

Together with the neutralizer, a complexing agent may be added to the mixed aqueous solution. The complexing agent is not limited to a particular agent and may be any one that can form a complex through bonding to metal elements such as nickel ions and manganese ions in an aqueous solution; examples of the complexing agent include an ammonium ion supplier. For the ammonium ion supplier, which is not limited to a particular substance, at least one selected from the group consisting of ammonia water, an aqueous ammonium sulfate solution, and an aqueous ammonium chloride solution can be used, for example. Among them, ammonia water is preferably used in view of handleability. When the ammonium ion supplier is used, the concentration of ammonium ions is preferably within a range of at least 5 g/L and up to 25 g/L.

For the neutralizer, an alkali solution can be used; general aqueous alkali metal hydroxide solutions such as sodium hydroxide and potassium hydroxide can be used, for example. Among them, an aqueous sodium hydroxide solution is preferably used in view of costs and handleability. Although an alkali metal hydroxide can be directly added to the reaction aqueous solution, it is preferably added as an aqueous solution in view of easiness of pH control. In this case, the concentration of the aqueous alkali metal hydroxide solution is preferably at least 12% by mass and up to 30% by mass and more preferably at least 20% by mass and up to 30% by mass. When the concentration of the aqueous alkali metal hydroxide solution is less than 12% by mass, a supply amount to the reaction tank increases, and particles may fail to sufficiently grow. In contrast, when the concentration of the aqueous alkali metal hydroxide solution is greater than 30% by mass, the pH value increases locally at an addition position of the alkali metal hydroxide, and fine particles may be generated.

The method of production of the present embodiment preferably includes a washing process after the crystallization process. The washing process is a process that washes away impurities contained in the composite hydroxide 1 obtained in the crystallization process. For a washing solution, pure water is preferably used. The amount of the washing solution is preferably at least 1 L relative to 300 g of the composite hydroxide 1. When the amount of the washing solution is less than 1 L relative to 300 g of the composite hydroxide 1, washing is insufficient, and the impurities may remain in the composite hydroxide 1. As to a method of washing, the washing solution such as pure water may be passed through a filter such as a filter press, for example. When $SO_4$ remaining in the composite hydroxide 1 is desired to be further washed away, sodium hydroxide, sodium carbonate, or the like is preferably used as the washing solution.

Figure 3:
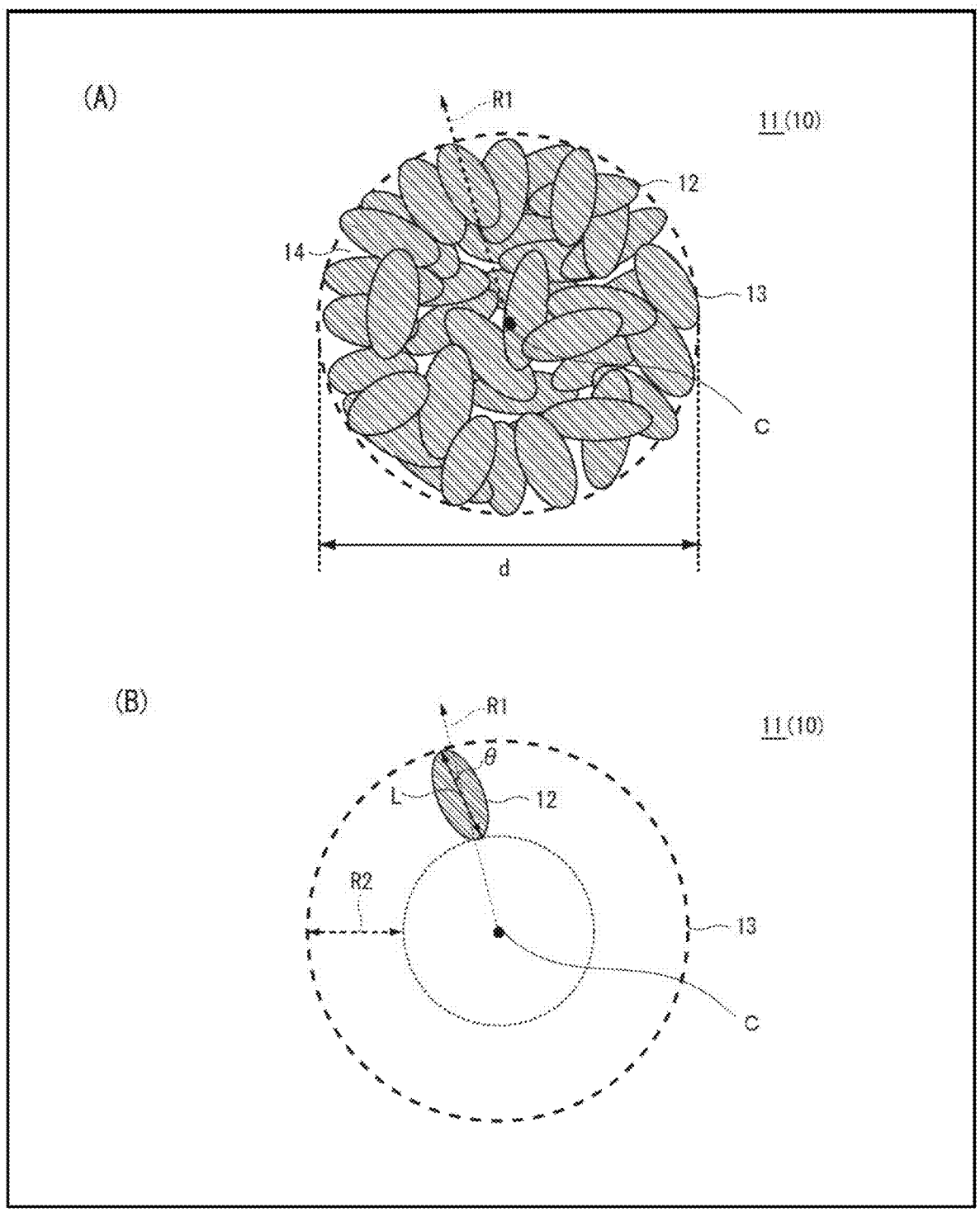
FIG. 3 includes schematic drawings that illustrates one example of the lithium-nickel-manganese composite oxide of the present embodiment.

(3) Positive Electrode Active Material for Nonaqueous Electrolyte Secondary Battery FIG. 3(A) is a schematic drawing that illustrates one example of the lithium-nickel-manganese composite oxide 11 (hereinafter, this is also referred to as "composite oxide 11") that constitutes the positive electrode active material 10 for a nonaqueous electrolyte secondary battery of the present embodiment (hereinafter, this positive electrode active material for a nonaqueous electrolyte secondary battery is also referred to as "positive electrode active material 10").

FIG. 3(B) is an explanatory drawing of disposition of the primary particles 12 in the positive electrode active material 10 (secondary particle 13). The composite oxide 11 is represented by General Formula (2): $Li_{1+t}Ni_xMn_yM_zO_{2+\beta}$ (in Formula (2), M is at least one additional element selected from Co, Ti, V, Cr, Zr, Nb, Mo, Hf, Ta, Fe, and W; and t, x, y, z, and $\beta$ satisfy $-0.05 \le t \le 0.5$, $0.1 \le x \le 0.9$, $0.05 \le y \le 0.8$, $0 \le z \le 0.8$, $x+y+z=1.0$, and $0 \le \beta \le 0.5$) and contains the secondary particle 13 formed of a plurality of flocculated primary particles 12. Here, in Formula (2), $\beta$ is a coefficient that varies in accordance with the valencies of the metal elements other than lithium and with the ratio of the lithium atom to the metal elements other than lithium included in the composite oxide 11.

As described below, the composite oxide 11 is formed by mixing the composite hydroxide 1 described above and a lithium compound together and firing the mixture. Consequently, the composition of the composite oxide 11 is substantially the same as that of the composite hydroxide 1 except lithium. In Formula (2), y and z preferably satisfy $0.1 \le y \le 0.8$ and, when M is Co, preferably satisfy $0.1 \le z \le 0.4$ for the same reason as y and z of Formula (1), for example.

The positive electrode active material 10 of the present embodiment using the composite hydroxide 1 as the precursor thereof can give the secondary battery having a very high energy density and a sufficient output characteristic. Here, although the composite oxide 11 mainly contains the secondary particle 13 formed of a plurality of flocculated primary particles 12, this may also include small amount of the primary particle 12 (independent), as in the case of the composite hydroxide 1. In addition, the positive electrode active material 10 may include lithium-metal composite oxides other than the composite oxide 11 so far as the effects of the present invention are not impaired. Hereinafter, each characteristic of the positive electrode active material 10 will be explained.

In the positive electrode active material 10, the degree of sparsity/density is at least 0.5% and up to 12%, and preferably at least 1.0% and up to 10%. When the degree of sparsity/density is within the range described above, the electrolyte solution can penetrate into inside the secondary particle 13 sufficiently well, so that a high battery capacity and a good output characteristic can be obtained; and in addition, the secondary particle 13 can be made to a dense state so that a high fillability can be obtained. Therefore, when the composite oxide 11 like this is used as the positive electrode active material in the secondary battery, the secondary battery having a high volume energy density and a sufficient output characteristic can be obtained. When the degree of sparsity/density is less than 0.5%, penetration of the electrolyte solution into inside the secondary particle is insufficient so that a high battery capacity cannot be obtained. Accordingly, even if the fillability into the battery container is high, the battery capacity of each particle decreases; and thus, the energy density as the whole active material decreases.

Here, "degree of sparsity/density" is the value obtained from the result of the image analysis of the cross section of the particle of the composite oxide 11 by using a scanning electron microscope (SEM), and this is the value represented by [(area of the void 14 inside the secondary particle 13/area of the cross section of the secondary particle 13)×100](%). For example, in the cross section of the particle of the composite oxide 11 depicted in FIG. 3, the degree of sparsity/density is the value represented by [(area of the void 14)/(sum of the area of the cross section of the primary particle 12 and the area of void 14)×100]. Here, similarly to the particle of the composite hydroxide 1, the degree of sparsity/density is an average degree of sparsity/density obtained by measuring each cross section of 20 particles of the secondary particles 13.

In the positive electrode active material 10, the DBP absorption amount (hereinafter, this is also referred to as "oil absorption amount") measured in accordance with JIS K6217-4:2008 is at least 12 cm$^3$/100 g and up to 20 cm$^3$/100 g. When the oil absorption amount is within the range described above, the secondary battery using the positive electrode active material 10 in the positive electrode can retain a sufficient amount of the electrolyte solution in the positive electrode so that migration of a lithium ion intervened by the electrolyte solution is not limited, and thus, a sufficient battery capacity can be obtained. When the oil absorption amount is less than 12 cm$^3$/100 g, the electrolyte solution retained in the positive electrode is insufficient, so that the battery capacity and the output characteristic deteriorate.

In the positive electrode active material 10, the ratio I(003)/I(104) of the diffraction peak intensity I(003) of the 003 plane to the peak intensity I(104) of the 104 plane (hereinafter, this ratio is also referred to as "peak intensity ratio"), obtained by X-ray diffraction measurement, is preferably at least 1.7, and more preferably at least 1.7 and up to 2.5. When the peak intensity ratio is at least 1.7, crystallinity of the positive electrode active material 10 is high so that the battery capacity and the output characteristic can be enhanced. In addition, when the peak intensity ratio is within the range described above, the primary particle grows in a specific crystal plane so that orientation of the primary particle 12 in the secondary particle 13 is enhanced thereby leading to a structure that at least some of the primary particles 12 are radially disposed from the central part C of the secondary particle 13 to the outer circumference thereof (radial structure). Because of the radial structure, penetration of the electrolyte solution into inside the positive electrode active material 10 is facilitated, and in addition, the stress load due to expansion and shrinkage of the positive electrode active material 10 caused upon charging and discharging can be relaxed in the particle boundary of the primary particles 12; and thus, the cycle characteristic can be enhanced.

In the primary particle 12 in the secondary particle 13 (positive electrode active material 10), for example, in the region R2 that is 50% of the radius from the outer circumference of the secondary particle 13 to the central part C of the particle (see FIG. 3(B)), it is preferable that at least 50% of the primary particles 12 in number relative to the total number of the primary particles 12 that are present in the 50% region be radially disposed from the central part C of the secondary particle 13 to the outer circumference thereof. With this, the positive electrode active material 10 can have the particle structure having a further enhanced radial orientation (radial structure); and thus, when used in the positive electrode of the secondary battery, the battery characteristics can be enhanced furthermore. In order to enhance the battery characteristics furthermore, it is more preferable that at least 70% of the primary particles 12 be radially disposed in the 50% radius region R2. When the dissolved oxygen concentration is within the range described before, by adjusting, for example, the stirring power together with the dissolved nickel concentration, the primary particle 12 can be disposed radially with a higher ratio thereof. For example, when the Ni concentration is adjusted in the range of at least 700 mg/L and up to 1,500 mg/L, and the stirring power in the range of at least 4.0 kW/m$^3$ and up to 12.0 kW/m$^3$, the radial structure can be realized further eminently.

Here, to be disposed radially means, for example, as can be seen in FIG. 3(B), the state in which the direction of the long diameter L of the primary particle 12 in the cross section of the composite hydroxide 11 is orientated in the radial direction R1 from the central part C of the secondary particle 13 to the outer circumference thereof. Here, to be orientated in the radial direction R1 means that in the cross section of the composite hydroxide 11, the angle difference 8 between the direction of the long diameter L of the primary particle 12 and the radial direction R1 is within up to 45°, and preferably within up to 30°. As can be seen, for example, in FIG. 3(B), the angle difference 8 between the direction of the long diameter L of the primary particle 12 and the radial direction R1 may be obtained from the angle between, among the radial directions from the central part C of the secondary particle 13 to the outer circumference thereof, the radial direction R1 that passes through the center of the long diameter and the direction of the long diameter L, in which the direction of the long diameter L is the direction from one end near the central part of the secondary particle 13 to the other end in the long diameter of the primary particle 12.

The positive electrode active material 10 has a tap density of preferably within a range of at least 2.0 g/cm$^3$ and up to 2.7 g/cm$^3$ and preferably within a range of at least 2.2 g/cm$^3$ and up to 2.5 g/cm$^3$. When the tap density is within the above range, the positive electrode active material achieves both excellent battery capacity and fillability, and battery energy density can be further improved.

The positive electrode active material 10 has a volume-average particle diameter MV preferably of at least 5 μm and up to 20 μm and more preferably of at least 6 μm and up to 15 μm. When the volume-average particle diameter MV is within the above range, the specific surface area is inhibited from reducing while fillability is maintained at a high level, and a battery using this positive electrode active material can achieve both high filling density and excellent output characteristics.

Furthermore, the positive electrode active material 10 preferably has [(D90–D10)/an average particle diameter] indicating a particle diameter variation index of at least 0.70. When the variation index of the positive electrode active material 10 is within the above range, fine particles and coarse particles appropriately mix, and particle fillability can be further improved while the cycle characteristics and output characteristics of the positive electrode active material 10 to be obtained are inhibited from degrading. In view of inhibiting excessive mixing of fine particles or coarse particles into the positive electrode active material 10, the variation index of the positive electrode active material 10 is preferably up to 1.2 and more preferably up to 1.0.

Figure 7:
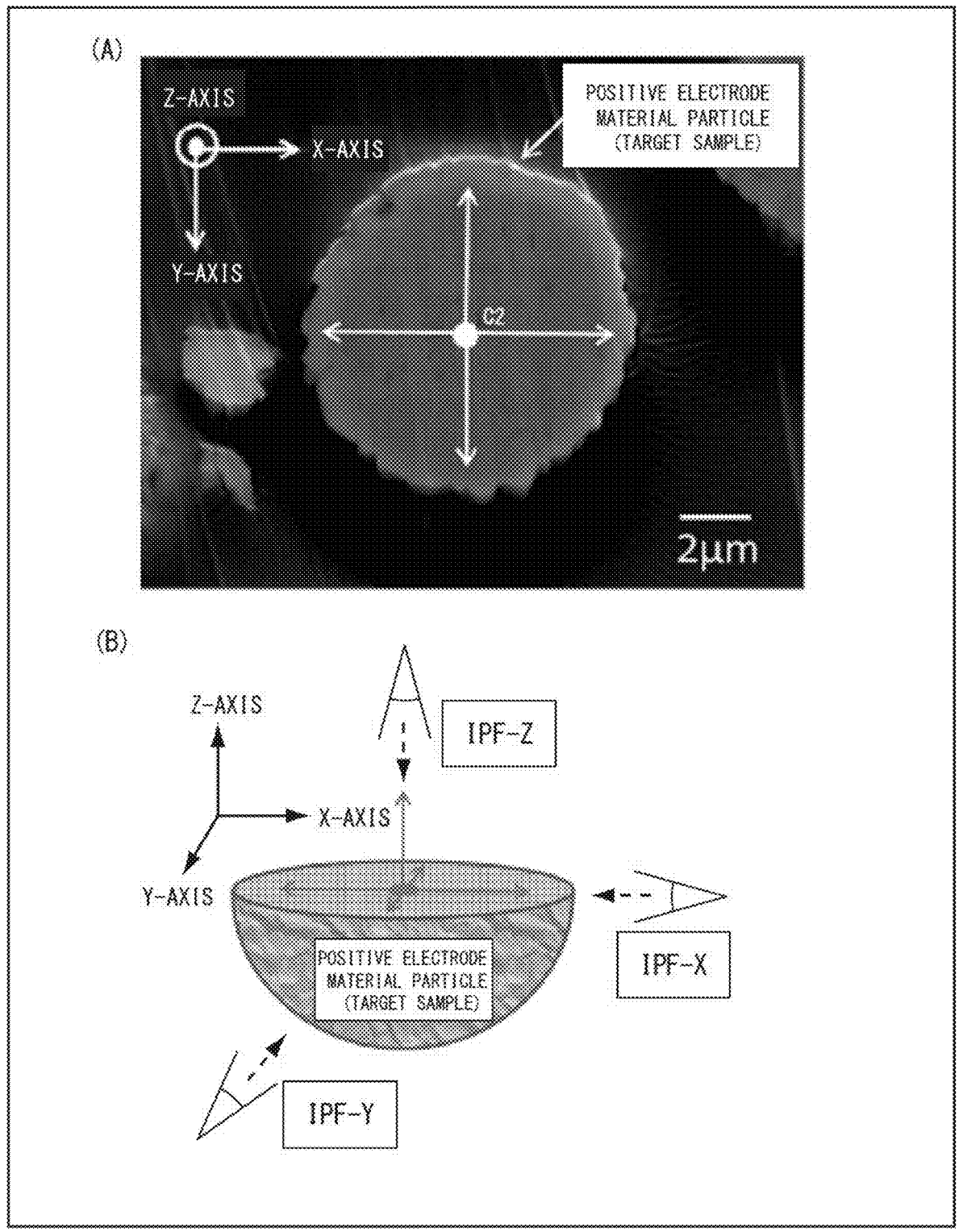
FIG. 7 includes explanatory drawings of the evaluation method of the crystal orientation of the positive electrode active material by using the electron backscatter diffraction method (EBSD).

FIG. 7(A) and FIG. 7(B) are the drawings to explain the evaluation method of the crystal orientation of the positive electrode active material 10 by using the electron backscatter diffraction method (EBSD). In EBSD, by using a scanning electron microscope (SEM), an electron beam is irradiated to a sample, and the Kikuchi pattern thereby formed in the sample's plane to be measured due to a diffraction phenomenon of the electron beam is analyzed so that the crystal direction and the like of a minute portion thereof can be measured. By analyzing the crystal direction measured by EBSD, the crystal orientation in a specific direction can be evaluated.

In this specification, an arbitrary radial direction from the center C2 of a cross section of the secondary particle 13 (see FIG. 7(A)), which constitutes the positive electrode active material 10, toward an outer circumference thereof is regarded as an x-axis direction and a direction perpendicular to the x-axis direction is regarded as a y-axis direction, and whereby an evaluation of the crystal orientation using EBSD is carried out. Hereinafter, each direction will be explained by referring to FIG. 7(A).

For example, as illustrated in FIG. 7(A), when the observation cross section is regarded as the paper surface, the x-axis direction in the cross section of the secondary particle 13 is the direction toward a horizontal direction from the center C2 in the observation cross section. Also, when the observation cross section is regarded as the paper surface, the y-axis direction in the cross section of the secondary particle 13 is the direction toward a perpendicular direction from the center C2 in the observation cross section. When the observation cross section is regarded as the paper surface, the z-axis direction is the vertical direction and the front direction from the center C2 in the observation cross section.

In the positive electrode active material 10 according to the present embodiment, the orientation rate of the crystal ab plane measured by EBSD in each of the x-axis direction and the y-axis direction is preferably at least 55%, more preferably at least 58%, and far preferably at least 60%. When the orientation rate of the crystal ab plane is within the range described above, the battery capacity can be enhanced furthermore.

The lithium-nickel-manganese composite oxide (positive electrode active material 10) has a hexagonal crystal structure, and it also has a layered structure in which a transition metal ion layer formed of nickel, manganese, and the like and a lithium ion layer are alternately stacked in a c-axis direction. Here, when the secondary battery is charged and discharged, the lithium ion in the crystal that constitutes the positive electrode active material 10 migrates to the [100]-axis direction or to the [110]-axis direction (ab plane), and thereby the lithium ion is inserted and de-inserted. Accordingly, although the detail is not yet clear, it is presumed that when the orientation rates of the crystal ab plane in the x-axis direction and the y-axis direction each are within the range described above, insertion and de-insertion of lithium ions can be facilitated furthermore in the positive electrode active material 10 thereby leading to a further increase in the battery capacity.

On the other hand, for example, in the positive electrode active material having the structure in which the primary particles are randomly flocculated, the orientation rate of the crystal ab plane in at least one of the x-axis direction and the y-axis direction is less than 55%, while the orientation rate in the c-axis direction increases. In this case, the battery capacity may be insufficient in the positive electrode active material 10 in the secondary battery (positive electrode).

Here, EBSD-based evaluation is carried out as follows. Namely, in the cross-sectional observation of the secondary particle 13, at least 3 of the secondary particle 13 that is at least 80% of the volume-average particle diameter (MV) are selected; and the orientation rates of the ab plane in the x-axis direction and the y-axis direction of each particle are measured followed by averaging these measured values. With regard to the specific evaluation method by EBSD, the method described in Example to be described later may be used.

(4) Method for Producing the Positive Electrode Active Material for a Nonaqueous Electrolyte Secondary Battery The production method of the present embodiment to produce the positive electrode active material for a nonaqueous electrolyte secondary battery (hereinafter, this material is also referred to as "positive electrode active material") is the method in which the material is a lithium-nickel-manganese composite oxide that is represented by General Formula (2): $Li_{1+t}Ni_xMn_yM_zO_{2+\beta}$ (in Formula (2), M is at least one additional element selected from Co, Ti, V, Cr, Zr, Nb, Mo, Hf, Ta, Fe, and W; and t, x, y, z, and β satisfy $-0.05 \leq t \leq 0.5$, $0.1 \leq x \leq 0.9$, $0.05 \leq y \leq 0.8$, $0 \leq z \leq 0.8$, $x+y+z=1.0$, and $0 \leq \beta \leq 0.5$) and contains the secondary particle formed of a plurality of flocculated primary particles.

Figure 4:
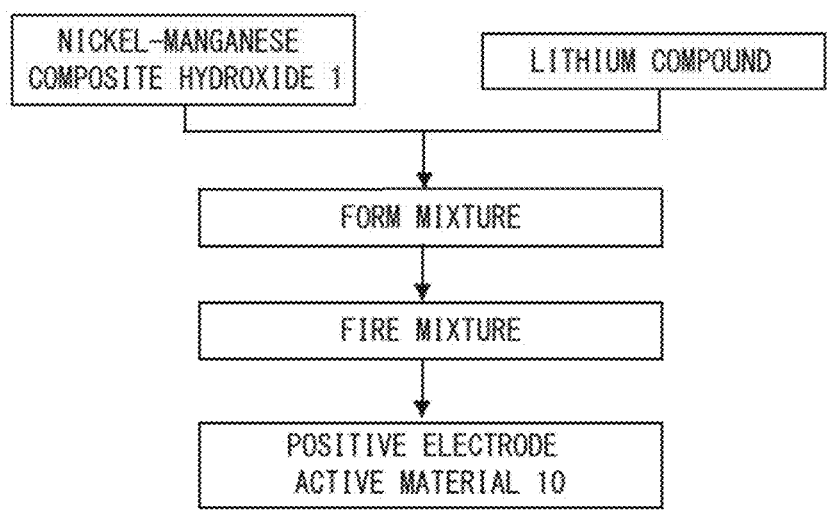
FIG. 4 is a drawing that illustrates one example of the production method of the lithium-nickel-manganese composite oxide of the present embodiment.

FIG. 4 is a diagram of an example of the method for producing a positive electrode active material 10 of the present embodiment. As illustrated in FIG. 4, the method for producing the positive electrode active material 10 includes a process of obtaining a mixture by mixing the composite hydroxide 1 and a lithium compound together and a firing process of obtaining a composite oxide 11 by firing the mixture. The morphology of the composite oxide 11 is strongly influenced by the morphology of the composite hydroxide 1 as a precursor. For this reason, the powder characteristics of the composite hydroxide 1 are adjusted to fall within the specific ranges as described above, whereby the powder characteristics of the composite oxide 11 can be controlled to fall within the specific ranges. The following describes the method for producing the positive electrode active material 10.

(Mixing Process)

First, the composite hydroxide 1 is mixed with a lithium compound to form a lithium mixture. It is preferable that the composite hydroxide 1 be obtained by the production method described above. The lithium compound is not particularly limited, and heretofore known lithium compounds may be used. For example, in view of easy availability, lithium hydroxide, lithium nitrate, lithium carbonate, or a mixture of these may be preferably used. Among them, in view of easy handling and stable quality, lithium hydroxide or lithium carbonate are more preferable as the lithium compound. Here, prior to the mixing process, the composite hydroxide 1 may be oxidized thereby converting it to a form of a nickel-manganese composite oxide, and then, this may be mixed with the lithium compound.

The composite hydroxide 1 and the lithium compound are mixed together such that the ratio (Li/Me) between the atom number of metals other than lithium in the lithium mixture, that is to say, the sum (Me) of the atom numbers of nickel, cobalt, and an additional element and the atom number (Li) of lithium is at least 0.95 and up to 1.50 and preferably at least 0.95 and up to 1.20. That is to say, Li/Me does not change before and after firing, and the Li/Me ratio mixed in this mixing process is a Li/Me ratio in the positive electrode active material, and Li/Me in the lithium mixture is mixed so as to be the same as Li/Me in the positive electrode active material to be obtained.

For mixing, general mixers can be used; examples thereof include shaker mixers, Loedige mixers, Julia mixers, and V blenders. Mixing may be performed sufficiently to the extent that the skeleton of the composite hydroxide 1 is not destroyed.

(Firing Process)

Next, the lithium compound is fired to obtain a composite oxide 11. The firing is performed in an oxidative atmosphere at at least 700° C. and up to 1,100° C. When the firing temperature is less than 700° C., firing is not sufficiently performed, and the tap density may reduce. In addition, when the firing temperature is less than 700° C., diffusion of lithium does not sufficiently proceed, surplus lithium remains, and a crystal structure may fail to be well-regulated, or the uniformity of the composition of nickel, manganese, and the like within the particle cannot be sufficiently obtained, and sufficient characteristics cannot necessarily be obtained when used for a battery. In contrast, when the firing temperature is greater than 1,100° C., a sparse part on a particle surface is made dense. In addition, sintering may fiercely occur among particles of the composite oxide 11, abnormal particle growth may occur, and consequently, particles after firing may increase in size and may fail to hold their substantially spherical secondary particle form. Such a positive electrode active material reduces in the specific surface area and thus causes a problem in that the resistance of a positive electrode increases to reduce battery capacity when used for a battery. The time for firing, which is not limited to a particular time, is about at least 1 hour and up to 24 hours.

In view of uniformly conducting a reaction of the composite hydroxide 1 or the composite oxide 11 obtained by oxidizing it and the lithium compound, the temperature is preferably raised up to the firing temperature with a temperature raising rate within a range of at least 1° C./min and up to 10° C./min, for example. Furthermore, before firing, the lithium compound may be held at a temperature near the melting point of the lithium compound for about 1 hour to 10 hours. With this, the reaction can be conducted more uniformly.

In the method for producing the positive electrode active material 10 of the present embodiment, the composite hydroxide 1 used may contain single primary particles 2 such as a primary particle 2 that has not been flocculated as the secondary particle 3 and a primary particle 2 that has fallen from the secondary particle 3 after being flocculated other than the composite hydroxide 1 including the secondary particle 3 formed of the flocculated primary particles 2. The composite hydroxide 1 used may contain a composite hydroxide produced by a method other the method described above or a composite oxide obtained by oxidizing the composite hydroxide to the extent that the effects of the present invention are not impaired.

(5) Nonaqueous Electrolyte Secondary Battery

The following describes an example of a nonaqueous electrolyte secondary battery (hereinafter, also referred to as a "secondary battery") of the present embodiment for each component. The secondary battery of the present embodiment includes a positive electrode, a negative electrode, and a nonaqueous electrolyte solution and includes components similar to those of general lithium ion secondary batteries. The embodiment described below is only by way of example, and the nonaqueous electrolyte secondary battery can be performed with forms to which various modifications and improvements have been made based on the knowledge of those skilled in the art including the following embodiment. The secondary battery is not limited to particular uses.

(Positive Electrode)

Using the positive electrode active material 10, the positive electrode of the nonaqueous electrolyte secondary battery is produced. The following describes an example of a method for manufacturing the positive electrode. First, the positive electrode active material 10 (powdery), an electric conductor, and a binding agent (binder) are mixed together, activated carbon as needed and a solvent for viscosity adjustment or the like are further added thereto, and this mixture is kneaded to produce a positive electrode mixture paste.

The mixture ratio of the materials in the positive electrode mixture is a factor for determining the performance of a lithium secondary battery and can thus be adjusted in accordance with uses. The mixture ratio of the materials can be similar to that of a positive electrode of known lithium secondary batteries; when the total mass of the solid content of the positive electrode mixture excluding the solvent is 100% by mass, 60 to 95% by mass of the positive electrode active material, 1 to 20% by mass of the electric conductor, and 1 to 20% by mass of the binding agent can be contained, for example.

The obtained positive electrode mixture paste is applied to the surface of a collector made of aluminum foil and is dried to scatter the solvent to produce a sheet-shaped positive electrode, for example. As needed, pressurizing may be performed using a roll press or the like in order to increase electrode density. The thus obtained sheet-shaped positive electrode is cut or the like into appropriate size in accordance with a target battery to be served for production of the battery. However, the method for producing the positive electrode is not limited to the exemplified one and may be another method.

Examples of the electric conductor include graphite (natural graphite, artificial graphite, expanded graphite, and the like) and carbon black materials such as acetylene black and Ketjen black.

Examples of the binding agent (binder), which plays a role of binding active material particles, include polyvinylidene fluoride (PVDF), polytetrafluoroethylene (PTFE), fluoro rubber, ethylene-propylene rubber, styrene butadiene, cellulosic resins, and polyacrylic acid.

As needed, a solvent for dispersing the positive electrode active material, the electric conductor, and the activated carbon and dissolving the binding agent is added to the positive electrode mixture. Specific examples of the solvent include organic solvents such as N-methyl-2-pyrrolidone. The activated carbon can be added to the positive electrode mixture in order to increase electric double layer capacity.

(Negative Electrode)

Examples of the negative electrode include metal lithium, lithium alloys. The negative electrode may be formed by applying a negative electrode mixture obtained by mixing a binding agent with a negative electrode active material that can occlude and desorb lithium ions and adding an appropriate solvent to be paste form to the surface of a metal foil collector such as copper, drying, and compressing it in order to increase electrode density as needed.

Examples of the negative electrode active material include natural graphite, artificial graphite, organic compound fired bodies such as phenol resin, and powder of carbon substances such as coke. In this case, examples of a negative electrode binding agent include fluorine-containing resins such as PVDF similarly to the positive electrode. Examples of a solvent in which the active material and the binding agent are dispersed include organic solvents such as N-methyl-2-pyrrolidone.

(Separator)

A separator is interposed between the positive electrode and the negative electrode. The separator separates the positive electrode and the negative electrode from each other and holds an electrolyte; examples thereof include thin films formed of polyethylene, polypropylene, or the like, the films having many minute holes.

(Nonaqueous Electrolyte Solution)

A nonaqueous electrolyte solution is a solution obtained by dissolving a lithium salt as a supporting salt in an organic solvent. Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyl tetrahydrofuran, and dimethoxy ethane; sulfur compounds such as ethylmethyl sulfone and butane sulfone; and phosphorous compounds such as triethyl phosphate and trioctyl phosphate; for the solvent, one or two or more in combination selected from the above can be used.

Examples of the supporting salt include $LiPF_6$, $LiBF_4$, $LiClO_4$, $LiAsF_6$, $LiN(CF_3SO_2)_2$ and their composite salts. Furthermore, the nonaqueous electrolyte solution may contain radical scavengers, surfactants, fire retardants, and the like.

(Shape and Configuration of Battery)

The nonaqueous electrolyte secondary battery of the present invention including the positive electrode, the negative electrode, the separator, and the nonaqueous electrolyte solution described above can be formed into various shapes such as cylindrical and stacked shapes. For any shape employed, the positive electrode and the negative electrode are stacked via the separator to form an electrode body, the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

EXAMPLES

The following describes specific examples of the present invention. The present invention, however, is not limited to these examples.

Example 1

[Preparation of Composite Hydroxide]

A prescribed amount of purified water was taken into a reaction vessel (60 L), and the stirring power was adjusted at 6.0 kW/m$^3$. Next, with stirring, the temperature inside the reaction vessel (liquid temperature) was set at 45° C. At this time, a nitrogen gas ($N_2$) was fed in such a way that the dissolved oxygen concentration in the solution in the reaction vessel became 2.8 mg/L by adjusting the $N_2$ flow rate. Into this reaction vessel, a 2.0 mol/L mixed aqueous solution dissolving nickel sulfate, cobalt sulfate, and manganese sulfate with a molar ratio of nickel:cobalt:manganese=35:35:30, a 25% by mass aqueous sodium hydroxide solution as an alkali solution, and a 25% by mass aqueous ammonia solution as a complexing agent were simultaneously and continuously added, and a neutralization crystallization reaction was carried out. The pH value and the ammonium ion concentration were adjusted in such a way that the dissolved nickel concentration became constant at 1080 mg/L. At this time, the ammonium ion concentration in the reaction vessel was in the range of 12 to 15 g/L. The total flow rate of the mixed solution, the aqueous sodium hydroxide solution, and the aqueous ammonia solution was controlled in such a way that the residence time of the metal salts included in the mixed aqueous solution became 8 hours. The pH value at this time was 11.6 based on the liquid temperature of 25° C. with the plus/minus fluctuation width of 0.1. After the reaction vessel became stable, the slurry including the nickel-cobalt-manganese composite hydroxide was recovered from an overflowing port; and then, a cake of the nickel-cobalt-manganese composite hydroxide was obtained by suction filtration. After filtration, impurities included therein were washed out by suction filtration with feeding 1 L of purified water to 140 g of the cake of the nickel-cobalt-manganese composite hydroxide present in the filtration equipment. The cake of the nickel-cobalt-manganese composite hydroxide after being washed was air-dried at 120° C. to obtain the nickel-cobalt-manganese composite hydroxide (hereinafter, this is also referred to as "composite hydroxide").

The particle size distribution of the obtained composite hydroxide was measured using a laser diffraction scattering type particle size distribution measurement apparatus. Consequently, the average particle diameter MV was 10.1 μm, and [(D90−D10)/the average particle diameter] was 0.78. The pore volume was measured by a nitrogen adsorption method. Consequently, the pore volume was 0.013 cm$^3$/g. The tap density was measured using a tapping apparatus (KYT 3000 manufactured by Seishin Enterprise Co., Ltd.) and was calculated from a volume and a sample weight after 500 times of tapping. Consequently, the tap density was 2.12 g/cm$^3$. The specific surface area was measured by a BET method by nitrogen adsorption. Consequently, the specific surface area was 5.8 m$^2$/g.

The surface and the cross section structure of the obtained composite hydroxide were observed with a scanning electron microscope (SEM). FIG. 5A and FIG. 5B respectively show the surface (FIG. 5A) and the cross section structure (FIG. 5B) of the obtained composite hydroxide. From the observation result of the surface, it was confirmed that the secondary particle that has a high sphericity and is composed of the plate-like primary particles was obtained. From the observation result of the cross section, it was confirmed that the inside of the particle had a very dense structure. In order to assess the degree of sparsity/density, the particle cross section and the void area within the particle were obtained by using the image analysis software (WinRoof 6.1.1); and then, the degree of sparsity/density was calculated from the equation [(void area within the particle)/(particle cross section)×100](%). Twenty cross sections of the secondary particles that were at least 80% of the volume-average particle diameter (MV) were arbitrarily selected, and the degree of sparsity/density of each of the cross sections of the secondary particles was measured; and the average value thereof (average degree of sparsity/density) was calculated to be 1.8%.

The obtained composite hydroxide was dissolved with an inorganic acid and was subjected to chemical analysis by ICP emission spectrometry, and it was revealed that its composition was Ni:Co:Mn=0.35:0.35:0.30 and that particles with a target composition were obtained. Table 1 lists characteristics of the obtained composite hydroxide.

[Production of Positive Electrode Active Material]

The above composite hydroxide and lithium carbonate were weighed so as to give a Li/Me of 1.06 and were thoroughly mixed together using a shaker mixer (TURBULA Type T2C manufactured by Willy A. Bachofen (WAB)) with strength to the extent that the skeleton of the precursor was maintained to obtain a lithium mixture (the mixing process).

This lithium mixture was inserted into a firing vessel made of magnesia, and using an enclosed electric furnace, the temperature was raised up to 950° C. at a temperature rising rate of 2.77° C./min in the atmosphere with a flow rate of 12 L/min and was held for 10 hours, and the lithium mixture was subjected to furnace cooling to room temperature to obtain a lithium-nickel-manganese composite oxide (hereinafter, this is also referred to as "lithium-transition metal composite oxide") (firing process).

A surface and a sectional structure of the obtained lithium-transition metal composite oxide were observed with a scanning electron microscope, and it was revealed that particles having good sphericity were obtained similarly to the composite hydroxide. Similarly to the composite hydroxide, particle size distribution measurement was performed on the obtained positive electrode active material. It was revealed that the average particle diameter D50 was 9.6 μm and that [(D90−D10)/the average particle diameter] was 0.80. The oil absorption amount and the tap density were measured to be 15.6 cm$^3$/100 g and 2.40 g/cm$^3$, respectively.

Figure 6:
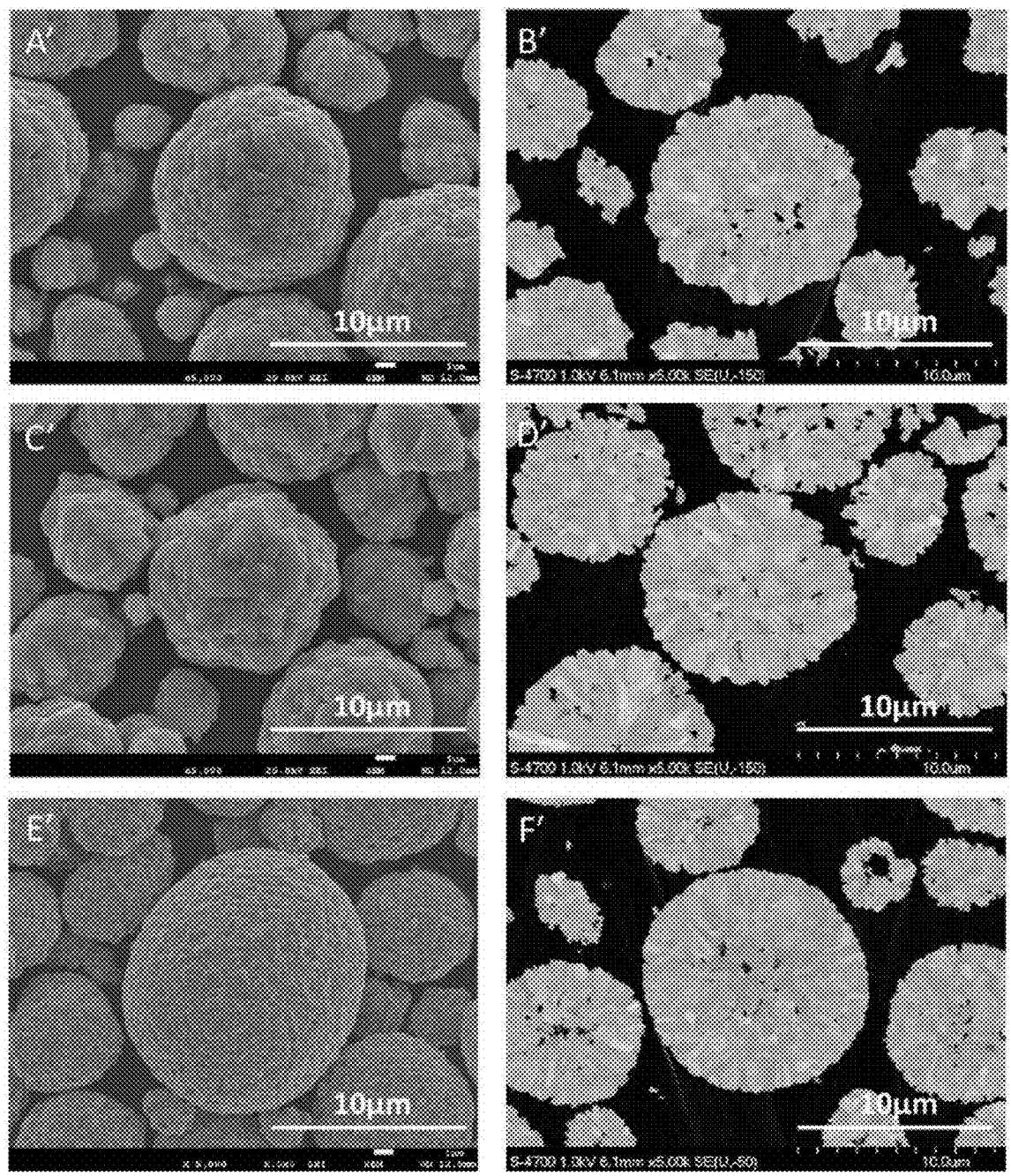
FIG. 6 includes pictures that illustrate outer appearances and cross sections of the positive electrode active material of the present embodiment.

A surface and a sectional structure of the obtained positive electrode active material were observed with a scanning electron microscope (SEM). FIGS. 6A' and 6B' show the surface (FIG. 6A') and the sectional structure (FIG. 6B') of the obtained positive electrode active material. It was revealed that secondary particle that has a high sphericity and is formed of plate-shaped primary particles, similar to the shape of the composite hydroxide, was obtained. The result of sectional observation revealed that the inside of the particle had a very dense structure. The degree of sparsity/density was calculated similarly to the composite hydroxide from the result of sectional observation to be 1.0%.

The obtained positive electrode active material was dissolved with an inorganic acid and was subjected to chemical analysis by ICP emission spectrometry, and it was revealed that its composition was $Li_{1.06}Ni_{0.35}Co_{0.35}Mn_{0.30}O_2$ and that particles with a target composition were obtained. Table 2 lists characteristics of the obtained positive electrode active material.

[Orientation Evaluation]

The orientation of the obtained active material secondary particle in the radial direction was evaluated by EBSD (electron backscatter diffraction method). In view of keeping the conductivity of the target sample for measurement, when the target sample was set inside the measurement apparatus, fixing to the target sample holder was made by using a conductive paste (colloidal carbon paste).

With regard to the measurement instrument, a scanning electron microscope (SEM) equipped with a computer capable of analyzing the crystal direction (ULTRA 55; manufactured by Carl Zeiss GmbH) was used. The acceleration voltage of an electron beam irradiated to the target sample was about 15 kV with the current amount of about 20 nA.

The orientation information in the x-axis and the y-axis was obtained in the strip of 2.5 μm×12.5 μm in the area to measure the crystal direction in the cross section of the target sample (plane to be measured), in which the measurement was made at 250,000 points in total.

In order to easily take the picture of the electron beam scattered by a camera that is installed in the SEM apparatus (Kikuchi beam), the target sample (more specifically the plane to be measured, i.e., the cross section) was tilted about 70° from a horizontal plane so as to irradiate the scattered electron beam to the camera.

The crystal direction of the material obtained by EBSD changes depending on the direction of the standard axis chosen by the observer. Usually, the crystal direction distribution diagram is represented, as the standard axis, by any axis of the orthogonal coordinate axes composed of an x-axis, a y-axis, and a z-axis. Hereinafter, the crystal direction distribution diagrams with the standard axis of the x-axis, the y-axis, and the z-axis are respectively called IPF-X, IPF-Y, and IPF-Z. FIG. 7(A) and FIG. 7(B) are the schematic drawings that express the observer's viewpoints corresponding to each crystal direction distribution diagram. As illustrated in FIG. 7(B), when the observation cross section is regarded as the plane of the paper, IPF-X is the crystal direction in the horizontal direction on this plane as the standard. IPF-Y is in the perpendicular direction on this plane as the standard. On the other hand, IPF-Z is the crystal direction in the vertical direction to the observation cross section as the standard.

In the case of the positive electrode active material, it is considered that the crystal direction information obtained when the edge of the positive electrode active material particle in which the lithium ion is transferred with the electrolyte solution is observed from the particle surface and the crystal direction information of the path in which the lithium ion inside the particle is de-inserted and that is in the radial direction from the center of the particle to the outside thereof are important. Therefore, when the orientation evaluation of the x-axis direction was carried out with regard to the radial direction of the particle, the analysis results of the IPF-X corresponding to the crystal direction observed from these directions were used; and similarly, the analysis results of the IPF-Y were used for the orientation in the y-axis direction.

The scattered electron beam (Kikuchi beam) was observed with a camera, and the data of the Kikuchi pattern observed with the camera were sent to a computer, and then, the Kikuchi pattern was analyzed to determine the crystal direction. For each measurement point of the determined crystal direction data of the target sample, the coordinates (x and y) and the Euler angles ($\phi 1$, $\Phi$, and $\phi 2$) that indicate the crystal direction were obtained.

The measurement points having the values of the Euler angles that were obtained by the sample evaluation were distributed to each crystal direction as the zone axis in accordance with the following conditions.

<001> axis: $\phi 1=0°\pm 30°$, $\Phi 0°\pm 30°$, $\phi 2=0°\cong 30°$
<100> axis: $\phi 1=0°\pm 30°$, $\Phi 90°\pm 30°$, $\phi 2=60°\cong 30°$
<110> axis: $\phi 1=0°\pm 30°$, $\Phi 0°\pm 30°$, $\phi 2=120°\cong 30°$ In accordance with the rule described above, each measurement point can be determined as to in which crystal direction the point is included.

After the above distribution, the ratio of each crystal direction in the plane to be measured was calculated by the number of the measurement points distributed to the respective crystal directions. The results thereof are listed in Table 2.

When executing this process, the commercially available analysis software for EBSD (analysis software for EBSD: Project Manager-Tango, sold by Oxford Instruments, Inc.) was used.

[Production of Battery]

Figure 8:
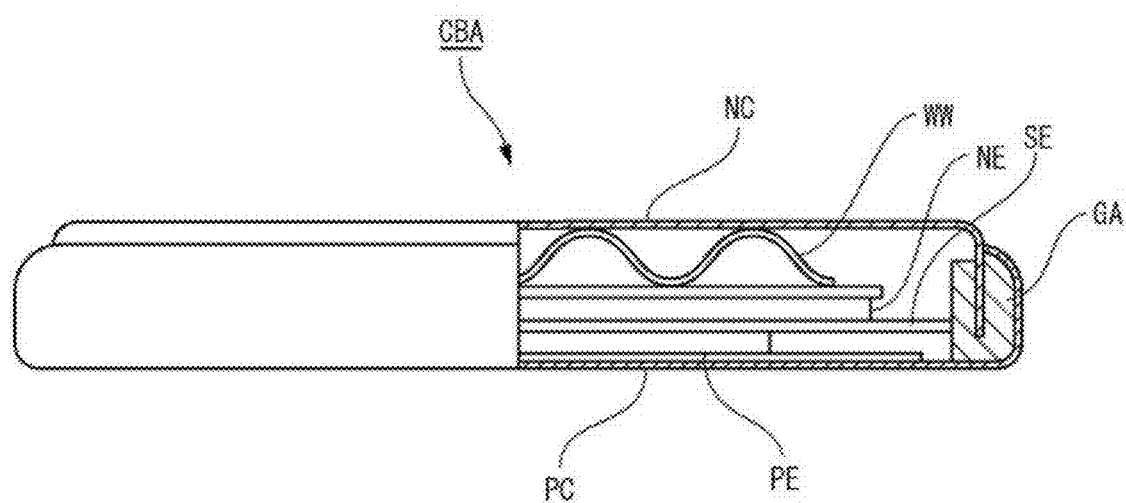
FIG. 8 is a schematic cross-sectional view of a coin-type battery used for evaluation of the battery characteristics.

Mixed together were 52.5 mg of the obtained positive electrode active material, 15 mg of acetylene black, and 7.5 mg of a polytetrafluoroethylene resin (PTFE), the resultant mixture was press-formed at a pressure of 100 MPa to a diameter of 11 mm and a thickness of 100 μm to form a positive electrode (an electrode for evaluation) PE illustrated in FIG. 8. The produced positive electrode PE was dried in a vacuum drier at 120° C. for 12 hours, and then using this positive electrode PE, a 2032 type coin battery CBA was produced in a glove box in an Ar atmosphere and the dew point of which was controlled to −80° C. For a negative electrode NE, lithium (Li) metal with a diameter of 17 mm and a thickness of 1 mm was used. For an electrolyte solution, a liquid mixture of an equivalent amount of ethylene carbonate (EC) and diethyl carbonate (DEC) with 1 M $LiClO_j$ as a supporting electrolyte (manufactured by Tomiyama Pure Chemical Industries, Ltd.) was used. For a separator SE, a polyethylene porous film with a film thickness of 25 μm was used. The coin battery has a gasket GA and a wave washer WW, and the coin-type battery was assembled with a positive electrode can PC and a negative electrode can NC.

Figure 9:
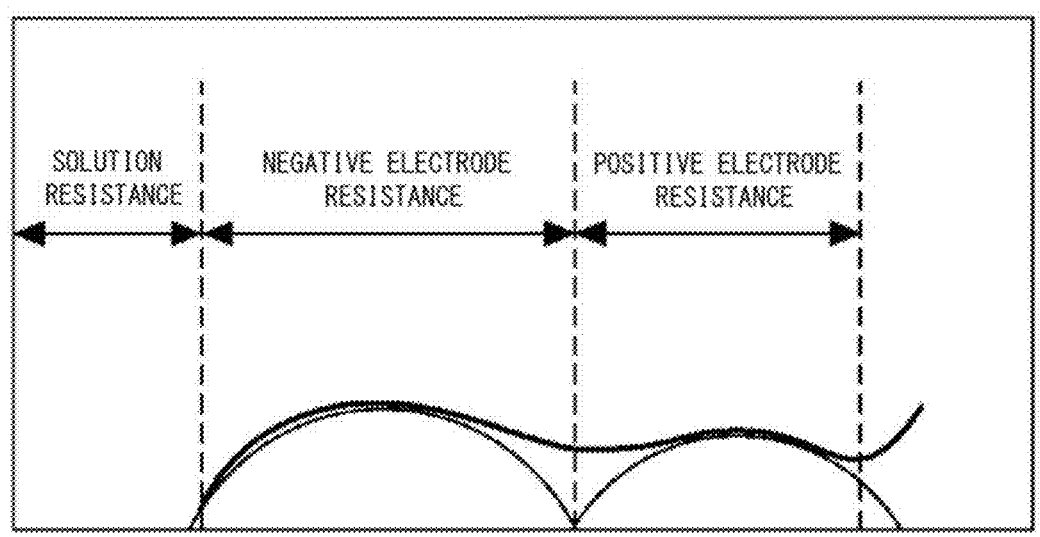
FIG. 9 is a drawing that illustrates one example of the Nyquist plot obtained by the alternate current impedance method.
Figure 10:
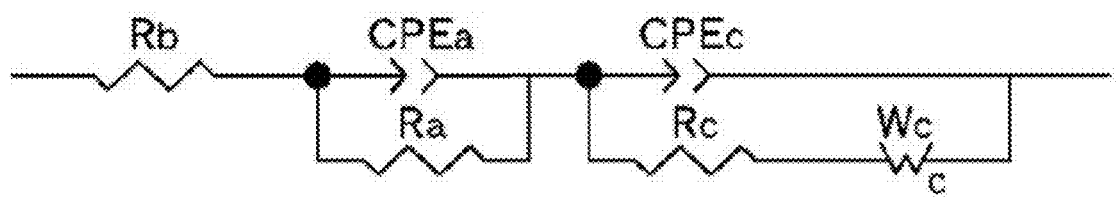
FIG. 10 is a schematic explanatory drawing that illustrates the equivalent circuit used for the analysis of the impedance evaluation.

An initial discharging capacity was determined as follows: the produced coin-type battery CBA was allowed to stand for about 24 hours, was charged to a cutoff voltage 4.3 V with a current density to the positive electrode PE of 0.1 $mA/cm^2$ after an open circuit voltage (OCV) stabilized, and was discharged to a cutoff voltage 3.0 V after a one-hour suspension; and the capacity at this time was taken as the initial discharging capacity. For the measurement of the discharging capacity, a multi-channel voltage/current generator (R6741A manufactured by Advantest Corporation) was used. For reaction resistance, the coin-type battery CBA was adjusted to have a measurement temperature and charged at a charge potential of 4.1 V, and then a resistance value was measured by an AC impedance method. For the measurement, using a frequency response analyzer and a potentiogalvanostat (1255B manufactured by Solartron), a Nyquist plot illustrated in FIG. 9 was created, and fitting calculation was performed using an equivalent circuit illustrated in FIG. 10 to calculate a value of positive electrode resistance (the reaction resistance). From the result of charging/discharging measurement, a discharge voltage was calculated, and from this value, the tap density, and the initial discharging capacity, volume energy density was calculated from the expression Volume energy density (Wh/L)=average discharge voltage (V)×discharging capacity (A/kg)×tap density (kg/L). Table 2 lists measurement results of the initial charging and discharging capacities, the positive electrode resistance value, and the volume energy density of the obtained active material.

Example 2

The composite hydroxide and the positive electrode active material were prepared in the same way as Example 1 except that the stirring power in the crystallization process was adjusted at 5.8 $kW/m^3$, and that the $N_2$ flow rate and the pH value were adjusted in such a way that in the reaction vessel the dissolved nickel concentration became 970 mg/L and the dissolved oxygen concentration became 4.5 mg/L. The characteristics of the obtained composite hydroxide are listed in Table 1. FIG. 5C and FIG. 5D are the surface (FIG. 5C) and the cross section structure (FIG. 5D) of the obtained composite hydroxide, respectively; and FIG. 6C' and FIG. 6D' are the surface (FIG. 6C') and the cross section structure (FIG. 6D') of the obtained positive electrode active material, respectively. Table 2 lists the characteristics and the evaluation results of the electrochemical characteristics of the obtained positive electrode active material. These evaluations were carried out in the same way as Example 1.

Example 3

[Preparation of Composite Hydroxide]

A prescribed amount of purified water was taken into a reaction vessel (60 L), and the stirring power was adjusted at 6.0 $kW/m^3$. Next, with stirring, the temperature inside the reaction vessel (liquid temperature) was set at 45° C. At this time, a nitrogen gas ($N_2$) was fed in such a way that the dissolved oxygen concentration in the solution in the reaction vessel became 3.5 mg/L by adjusting the $N_2$ flow rate.

Into this reaction vessel, a 2.0 mol/L mixed aqueous solution dissolving nickel sulfate, cobalt sulfate, and manganese sulfate with a molar ratio of nickel:cobalt:manganese=60:20:20, a 25% by mass aqueous sodium hydroxide solution as an alkali solution, and a 25% by mass aqueous ammonia solution as a complexing agent were simultaneously and continuously added, and a neutralization crystallization reaction was carried out. The pH value and the ammonium ion concentration were adjusted in such a way that the dissolved nickel concentration became constant at 720 mg/L. At this time, the ammonium ion concentration in the reaction vessel was in the range of 12 to 15 g/L. The total flow rate of the mixed solution, the aqueous sodium hydroxide solution, and the aqueous ammonia solution was controlled in such a way that the residence time of the metal salts included in the mixed aqueous solution became 8 hours. The pH value at this time was 11.7 based on the liquid temperature of 25° C. with the plus/minus fluctuation width of 0.1. After the reaction vessel became stable, the slurry including the nickel-cobalt-manganese composite hydroxide was recovered from the overflowing port; and then, a cake of the nickel-cobalt-manganese composite hydroxide was obtained by suction filtration. After filtration, impurities included therein were washed out by suction filtration with feeding 1 L of purified water to 140 g of the cake of the nickel-cobalt-manganese composite hydroxide present in the filtration equipment. The cake of the nickel-cobalt-manganese composite hydroxide after being washed was air-dried at 120° C. to obtain the nickel-cobalt-manganese composite hydroxide (hereinafter, this is also referred to as "composite hydroxide"). The surface and the cross section structure of the obtained composite hydroxide were observed with a scanning electron microscope (SEM). FIG. 5E and FIG. 5F are the surface (FIG. 5E) and the cross section structure (FIG. 5F) of the obtained composite hydroxide, respectively.

After the obtained composite hydroxide was dissolved into an inorganic acid, the chemical analysis thereof was carried out with an ICP emission spectrometry; and as a result, the composition thereof was Ni:Co:Mn=0.60:0.20:0.20, so that it was confirmed that the particle having the intended composition was able to be obtained. The characteristics of the obtained composite hydroxide are listed in Table 1.

[Preparation of Positive Electrode Active Material]

After the composite hydroxide and lithium carbonate were weighed so as to give the Li/Me ratio of 1.03, they were fully mixed to obtain a lithium mixture by using a shaker mixer (TURBULA Type T2C; manufactured by Willy A. Bachofen AG (WAB)) with applying a strength that the shape and structure of the precursor were able to be almost retained (mixing process).

The lithium mixture thus obtained was inserted into a magnesia-made firing vessel, and by using a sealed-type electric furnace, the temperature thereof was raised in an air atmosphere with the flow rate thereof being 12 L/minute and with the temperature raising rate of 2.77° C./minute until 900° C., at which temperature the mixture was kept for 10 hours; and then, it was cooled in the furnace to room temperature to obtain the lithium-nickel-manganese composite oxide (hereinafter, this is also referred to as "lithium-transition metal composite oxide") (firing process).

The surface and the cross section structure of the obtained positive electrode active material were observed with a scanning electron microscope (SEM). FIG. 6E' and FIG. 6F' are the surface (FIG. 6E') and the cross section structure (FIG. 6F') of the obtained positive electrode active material, respectively. After the obtained positive electrode active material was dissolved into an inorganic acid, the chemical analysis thereof was carried out with an ICP emission spectrometry; and as a result, the composition thereof was $Li_{1.03}Ni_{0.60}Co_{0.20}Mn_{0.20}O_2$, so that it was confirmed that the particle having the intended composition was able to be obtained. The characteristics of the obtained composite hydroxide are listed in Table 2. Each evaluation was carried out in the same way as Example 1.

Comparative Example 1

The composite hydroxide and the positive electrode active material were prepared in the same way as Example 1 except that the stirring power in the crystallization process was adjusted at 5.5 kW/m$^3$, and that the N$_2$ flow rate and the pH value were adjusted in such a way that in the reaction aqueous solution the dissolved nickel concentration became 410 mg/L and the dissolved oxygen concentration became 5.8 mg/L. The characteristics of the obtained composite hydroxide are listed in Table 1. The characteristics and the evaluation results of the electrochemical characteristics of the obtained positive electrode active material are listed in Table 2. These evaluations were carried out in the same way as Example 1.

Comparative Example 2

The composite hydroxide and the positive electrode active material were prepared in the same way as Example 1 except that the stirring power in the crystallization process was adjusted at 5.2 kW/m$^3$, and that an air instead of N$_2$ is fed with the changed flow rate and the pH value were adjusted in such a way that in the reaction aqueous solution the dissolved nickel concentration became 300 mg/L and the dissolved oxygen concentration became 6.2 mg/L. The characteristics of the obtained composite hydroxide are listed in Table 1. The characteristics and the evaluation results of the electrochemical characteristics of the obtained positive electrode active material are listed in Table 2. These evaluations were carried out in the same way as Example 1.

Comparative Example 3

A composite hydroxide and a positive electrode active material were produced similarly to Example 3 except that the stirring power in the crystallization process was adjusted to 5.8 kW/m$^3$ and that the N$_2$ flow rate and the pH value were adjusted so as to give a dissolved nickel concentration of 350 mg/L and a dissolved oxygen concentration of 5.8 mg/L in the reaction aqueous solution. Table 1 lists characteristics of the obtained composite hydroxide. Table 2 lists characteristics and electrochemical characteristic evaluation results of the obtained positive electrode active material. The evaluations were performed similarly to those in Example 1.

TABLE 1

| | | | Example 1 | Example 2 | Example 3 | Compara. Example 1 | Compara. Example 2 | Compara. Example 3 |
|---|---|---|---|---|---|---|---|---|
| Crystallization condition | Dissolved Ni concentration | (mg/L) | 1080 | 970 | 720 | 410 | 300 | 350 |
| | Dissolved oxygen concentration | (mg/L) | 2.8 | 4.5 | 3.5 | 5.8 | 6.2 | 5.8 |
| | Stirring power | (kW/m$^3$) | 6.0 | 5.8 | 6.0 | 5.5 | 5.2 | 5.8 |
| | Crystallization temperature | (° C.) | 45 | 45 | 45 | 45 | 45 | 45 |
| | pH | — | 11.6 | 11.7 | 11.7 | 12.0 | 12.1 | 11.8 |
| Composite hydroxide | Composition $Ni_xMn_yM_z(OH)_2$ (M=Co) | x | 0.35 | 0.35 | 0.60 | 0.35 | 0.35 | 0.60 |
| | | y | 0.30 | 0.30 | 0.20 | 0.30 | 0.30 | 0.20 |
| | | z | 0.35 | 0.35 | 0.20 | 0.35 | 0.35 | 0.20 |
| | (001) plane half width | (°) | 0.283 | 0.367 | 0.298 | 0.428 | 0.487 | 0.336 |
| | Average particle diameter MV | (μm) | 10.1 | 10.2 | 11.6 | 10.1 | 10.1 | 11.5 |
| | Degree of sparsity/density | (%) | 1.8 | 4.1 | 2.3 | 19.0 | 24.8 | 16.5 |
| | Pore volume | (cm$^3$/g) | 0.013 | 0.021 | 0.015 | 0.056 | 0.061 | 0.062 |
| | (D90 − D10)/MV | — | 0.78 | 0.82 | 1.02 | 0.85 | 0.91 | 1.03 |
| | Specific surface area | (m$^2$/g) | 5.8 | 12.2 | 11.1 | 14.7 | 18.5 | 13.3 |
| | Tap density | (g/cm$^3$) | 2.12 | 1.95 | 2.2 | 1.50 | 1.21 | 1.76 |

TABLE 2

| | | | Example 1 | Example 2 | Example 3 | Compara. Example 1 | Compara. Example 2 | Compara. Example 3 |
|---|---|---|---|---|---|---|---|---|
| Production condition | Li/Me Ratio | — | 1.06 | 1.06 | 1.03 | 1.06 | 1.06 | 1.03 |
| | Firing temperature | (° C.) | 950 | 950 | 900 | 950 | 950 | 900 |
| Lithium-metal composite oxide | Composition $Li_{i+t}Ni_xMn_yM_zO_2$ (M=Co) | t | 0.06 | 0.06 | 0.03 | 0.06 | 0.06 | 0.03 |
| | | x | 0.35 | 0.35 | 0.60 | 0.35 | 0.35 | 0.60 |
| | | y | 0.30 | 0.30 | 0.20 | 0.30 | 0.30 | 0.20 |
| | | z | 0.35 | 0.35 | 0.20 | 0.35 | 0.35 | 0.20 |
| | Average particle diameter MV | (μm) | 9.6 | 9.8 | 11.4 | 9.3 | 9.2 | 11.3 |
| | Degree of sparsity/density | (%) | 1.0 | 1.9 | 1.2 | 21.1 | 27.9 | 13.2 |
| | Tap density | (g/cm$^3$) | 2.40 | 2.32 | 2.67 | 1.94 | 1.59 | 2.20 |
| | Oil absorption amount | (cm$^3$/100 g) | 15.6 | 17.7 | 16.1 | 26.9 | 33.3 | 20.3 |
| | (D90 − D10)/MV | — | 0.80 | 0.81 | 1.00 | 0.82 | 0.91 | 1.00 |
| | I(003)/I(104) | — | 1.95 | 1.74 | 1.72 | 1.91 | 1.96 | 1.59 |
| | ab plane orientation rate | X-axis direction (%) | 59.8 | 63.3 | 66.1 | 68.3 | 62.0 | 65.5 |
| | | Y-axis direction (%) | 63.2 | 75.0 | 83.6 | 45.8 | 39.5 | 51.7 |
| | Orientation | | ○ | ○ | ○ | x | x | x |
| Battery characteristics | Initial charging capacity | (mAh/g) | 175.2 | 175.8 | 195.2 | 176.8 | 177.5 | 196.0 |
| | Initial discharging capacity | (mAh/g) | 158.8 | 161.0 | 177.7 | 163.1 | 164.4 | 179.1 |
| | Volume-based energy density | (Wh/L) | 1460 | 1431 | 1817 | 1212 | 1001 | 1509 |
| | Reaction resistance | (Ω) | 2.65 | 2.40 | 2.32 | 2.16 | 1.98 | 2.15 |

(Evaluation Results)

In Examples 1 to 3, because the dissolved oxygen concentration, the dissolved nickel concentration, and the stirring power are adjusted in the optimum respective values, the composite hydroxide having a high reactivity with Li and a specific half width area, which is the indicator of the dense particle, is obtained. In addition, the results of the pore volume and the average degree of sparsity/density, too, indicate that the composite hydroxide having high density and fillability is obtained. The positive electrode active material synthesized from the composite hydroxide like this has, similarly to the composite hydroxide, high density and particle fillability, so that the volume energy density thereof is high. In addition, in Examples 1 to 3, in the EBSD-based orientation evaluation, regarding orientations in the radial direction of both the x-axis and y-axis, the orientation rates of the ab plane, which is advantageous in insertion and de-insertion of Li ions, were at least 55%, thereby indicating that the radial structure was formed. In Example 1, from the SEM image of the cross section, too, in the region R2 that is 50% of the radius from the outer circumference of the secondary particle (positive electrode active material) to the center of the particle (see FIG. 3(B)), 60% of the primary particles in number relative to the total number of the primary particles that were present in the region R2 were radially disposed from the center of the secondary particle to the outer circumference thereof (radial direction R1, see FIG. 3(B)). Similarly, in Example 2 and Example 3, the primary particles of 83% and 87%, respectively, were radially disposed.

On the other hand, in Comparative Examples 1 to 3, because the dissolved oxygen concentrations were higher than the conditions of Examples, the half widths of the composite hydroxides thereof were larger than those of Examples, so that the particles having high pore volumes and average sparse densities were resulted. Accordingly, the particle fillabilities thereof were inferior to those of Examples. In the positive electrode active materials synthesized from these composite hydroxides, the volume energy densities were lower than Examples. In addition, in Comparative Examples 1 to 3, in the orientation evaluation by EBSD, the orientation rates in the crystal ab plane in the y-axis direction were less than 55%.

Accordingly, when the dissolved nickel concentration, the dissolved oxygen concentration, and the stirring power are adjusted at the optimum respective values, the composite hydroxide having high density and fillability can be obtained. In addition, when the nickel-manganese composite hydroxide like this is used, the positive electrode active material having a very high volume energy density can be obtained.

The technical scope of the present invention is not limited to the aspects described in the embodiment and the like. One or more of the requirements described in the embodiment and the like may be omitted. The requirements described in the embodiment and the like can be combined as appropriate. Japanese Patent Application No. 2016-150505 and all the literature cited in this specification are herein incorporated by reference in their entirety to the extent allowed by law.

DESCRIPTION OF REFERENCE SIGNS

1 Nickel-manganese composite hydroxide
2 Primary particle (nickel-manganese composite hydroxide)
3 Secondary particle (nickel-manganese composite hydroxide)
4 Void (nickel-manganese composite hydroxide)
d Particle diameter of secondary particle
10 Positive electrode active material
11 Lithium-nickel-manganese composite oxide
12 Primary particle (lithium-nickel-manganese composite oxide)
13 Secondary particle (lithium-nickel-manganese composite oxide)
14 Void (lithium-nickel-manganese composite oxide)
C Central part of secondary particle (lithium-nickel-manganese composite oxide)
L Direction of long diameter of primary particle
R1 Radial direction
R2 Area within 50% of a radius of the secondary particle from the outer circumference toward the particle center

The invention claimed is:

1. A positive electrode active material for a nonaqueous electrolyte secondary battery, the positive active material comprising: a lithium-nickel-manganese composite oxide represented by General Formula (2): $Li_{1+t}Ni_xMn_yM_zO_{2+\beta}$ in Formula (2), M is at least one additional element selected from Co, Ti, V, Cr, Zr, Nb, Mo, Hf, Ta, Fe, and W; and t, x, y, z, and β satisfy $-0.05 \leq t \leq 0.5$, $0.1 \leq x \leq 0.9$, $0.05 \leq y\ 0.8$, $0 \leq z \leq 0.8$, $x+y+z=1.0$, and $0 \leq \beta \leq 0.5$ and containing a secondary particle formed of a plurality of flocculated primary particles, wherein
a degree of sparsity/density represented by [(void area within secondary particle/cross section of secondary particle)×100](%) is at least 0.5% and up to 12%, and a DBP absorption amount measured in accordance with JIS K6217-4 is at least 12 $cm^3$/100 g and up to 20 $cm^3$/100 g, and
[(D90−D10)/average particle diameter] that is an indicator to represent a spread of particle size distribution is at least 0.7.

2. The positive electrode active material for a nonaqueous electrolyte secondary battery according to claim 1, wherein a tap density is at least 2.0 $g/cm^3$ and up to 2.7 $g/cm^3$.

3. The positive electrode active material for a nonaqueous electrolyte secondary battery according to claim 1, wherein a ratio I(003)/I(104) of a diffraction peak intensity I(003) of a 003 plane to a peak intensity I(104) of a 104 plane, obtained by X-ray diffraction measurement, is at least 1.7.

4. The positive electrode active material for a nonaqueous electrolyte secondary battery according to claim 1, wherein when an arbitrary radial direction from a center of a cross section of the secondary particle toward an outside thereof is regarded as an x-axis direction and a direction perpendicular to the x-axis direction is regarded as a y-axis direction, an orientation rate of a crystal ab plane measured by an electron backscatter diffraction method is at least 55% in each of the x-axis direction and the y-axis direction.

5. A nonaqueous electrolyte secondary battery comprising the positive electrode active material for a nonaqueous electrolyte secondary battery according to claim 1 for a positive electrode thereof.

* * * * *